US010768583B2

(12) United States Patent
Fuji et al.

(10) Patent No.: US 10,768,583 B2
(45) Date of Patent: Sep. 8, 2020

(54) LEARNING CONTROL SYSTEM AND LEARNING CONTROL METHOD

(71) Applicant: HITACHI, LTD., Tokyo (JP)

(72) Inventors: Taiki Fuji, Tokyo (JP); Kohsei Matsumoto, Tokyo (JP); Kiyoto Ito, Tokyo (JP)

(73) Assignee: HITACHI, LTD., Tokyo (JP)

( * ) Notice: Subject to any disclaimer, the term of this patent is extended or adjusted under 35 U.S.C. 154(b) by 196 days.

(21) Appl. No.: 16/029,877

(22) Filed: Jul. 9, 2018

(65) Prior Publication Data
US 2019/0072916 A1 Mar. 7, 2019

(30) Foreign Application Priority Data
Sep. 7, 2017 (JP) .................. 2017-172271

(51) Int. Cl.
*G05B 13/02* (2006.01)
*G05B 13/04* (2006.01)
*G06N 3/00* (2006.01)

(52) U.S. Cl.
CPC ....... *G05B 13/0265* (2013.01); *G05B 13/048* (2013.01); *G06N 3/00* (2013.01)

(58) Field of Classification Search
CPC .... G05B 13/0265; G05B 13/048; G06N 3/00; G06N 20/00; G06N 3/006; G06N 3/126
See application file for complete search history.

(56) References Cited

U.S. PATENT DOCUMENTS

| 2008/0154393 A1* | 6/2008 | Reshef ............... G05B 19/4183 700/65 |
| 2013/0103216 A1* | 4/2013 | Beal ..................... H02J 3/14 700/291 |
| 2013/0185437 A1* | 7/2013 | Willig ................... H04L 67/125 709/226 |

(Continued)

FOREIGN PATENT DOCUMENTS

JP  2014-099113 A  5/2014

OTHER PUBLICATIONS

L. Busoniu, et al., , "A comprehensive survey of multiagent reinforcement learning", IEEE Transactions on Systems Man and Cybernetics—Part C Applications and Reviews, vol. 38, No. 2, p. 156 to 172, Mar. 2008.

(Continued)

*Primary Examiner* — Charles R Kasenge
(74) *Attorney, Agent, or Firm* — Mattingly & Malur, PC

(57) ABSTRACT

A learning control system is provided in each of a plurality of subsystems of a system and includes a plurality of agents that performs learning to control of the subsystem using a control model and a learning management agent that manages and controls learning of each of the plurality of agents. The learning management agent is operated with a plurality of experiment systems including the plurality of control model sets of the plurality of agents and determines a plurality of updating control model sets in the plurality of experiment systems of a next generation from an evaluation result of the plurality of experiment systems of the current generation. The agent transmits control model information of a current generation to the learning management agent and receives control model information of the next generation from the learning management agent.

20 Claims, 20 Drawing Sheets

(56) References Cited

U.S. PATENT DOCUMENTS

| | | | | |
|---|---|---|---|---|
| 2013/0245837 A1* | 9/2013 | Grohman | ............... | F24F 11/62 |
| | | | | 700/276 |
| 2014/0282458 A1* | 9/2014 | Gupta | ..................... | G06F 8/65 |
| | | | | 717/168 |
| 2015/0074282 A1* | 3/2015 | Willig | ................. | H04L 67/125 |
| | | | | 709/226 |
| 2015/0081052 A1* | 3/2015 | Willig | ................. | H04L 67/125 |
| | | | | 700/90 |
| 2015/0088328 A1* | 3/2015 | Willig | ................. | H04L 67/125 |
| | | | | 700/291 |
| 2015/0192922 A1* | 7/2015 | He | ................... | G05B 19/4188 |
| | | | | 700/96 |
| 2015/0373043 A1* | 12/2015 | Wang | ................ | G06F 21/6254 |
| | | | | 706/12 |
| 2017/0139382 A1* | 5/2017 | Sayyarrodsari | ...... | G05B 13/048 |
| 2017/0212487 A1* | 7/2017 | Gupta | ................. | G05B 19/042 |
| 2019/0231436 A1* | 8/2019 | Panse | ................... | A61B 34/20 |

OTHER PUBLICATIONS

Lillicrap et. al, "Continuous Control With Deep Reinforcement Learning", Conference paper at ICLR 2016.

* cited by examiner

SELECTION AND UPDATING OF CONTROL MODEL BETWEEN GENERATIONS

PROCESS FLOW (1) OF AGENT IN FIRST EMBODIMENT

FIG. 13

MODIFICATION EXAMPLE OF UPDATING CONTROL MODEL

| | \multicolumn{4}{c}{CONTROL MODEL OF EACH AGENT OF EXPERIMENT SYSTEM} | NUMBER OF SIMULTANEOUS LEARNING AGENTS ↓ |
|---|---|---|---|---|---|
| | A1—C1 | A2—C2 | A3—C3 | A4—C4 | |
| GENERATION: G | SIMULATION (N) NON-UPDATABLE | UPDATABLE (L) | UPDATABLE (L) | SIMULATION (N) NON-UPDATABLE | 2 |
| G+1 | SIMULATION (N) NON-UPDATABLE | NON-UPDATABLE (F) | NON-UPDATABLE (F) | UPDATABLE (L) | 3 |
| G+2 | UPDATABLE (L) | NON-UPDATABLE (F) | NON-UPDATABLE (F) | NON-UPDATABLE (F) | 4 |
| G+3 | UPDATABLE (L) | UPDATABLE (L) | NON-UPDATABLE (F) | NON-UPDATABLE (F) | 4 |
| G+4 | NON-UPDATABLE (F) | NON-UPDATABLE (F) | UPDATABLE (L) | NON-UPDATABLE (F) | 4 |
| G+5 | NON-UPDATABLE (F) | NON-UPDATABLE (F) | NON-UPDATABLE (F) | UPDATABLE (L) | 4 |

SIMULTANEOUS LEARNING AGENT: AGENT OTHER THAN SIMULATION (N)

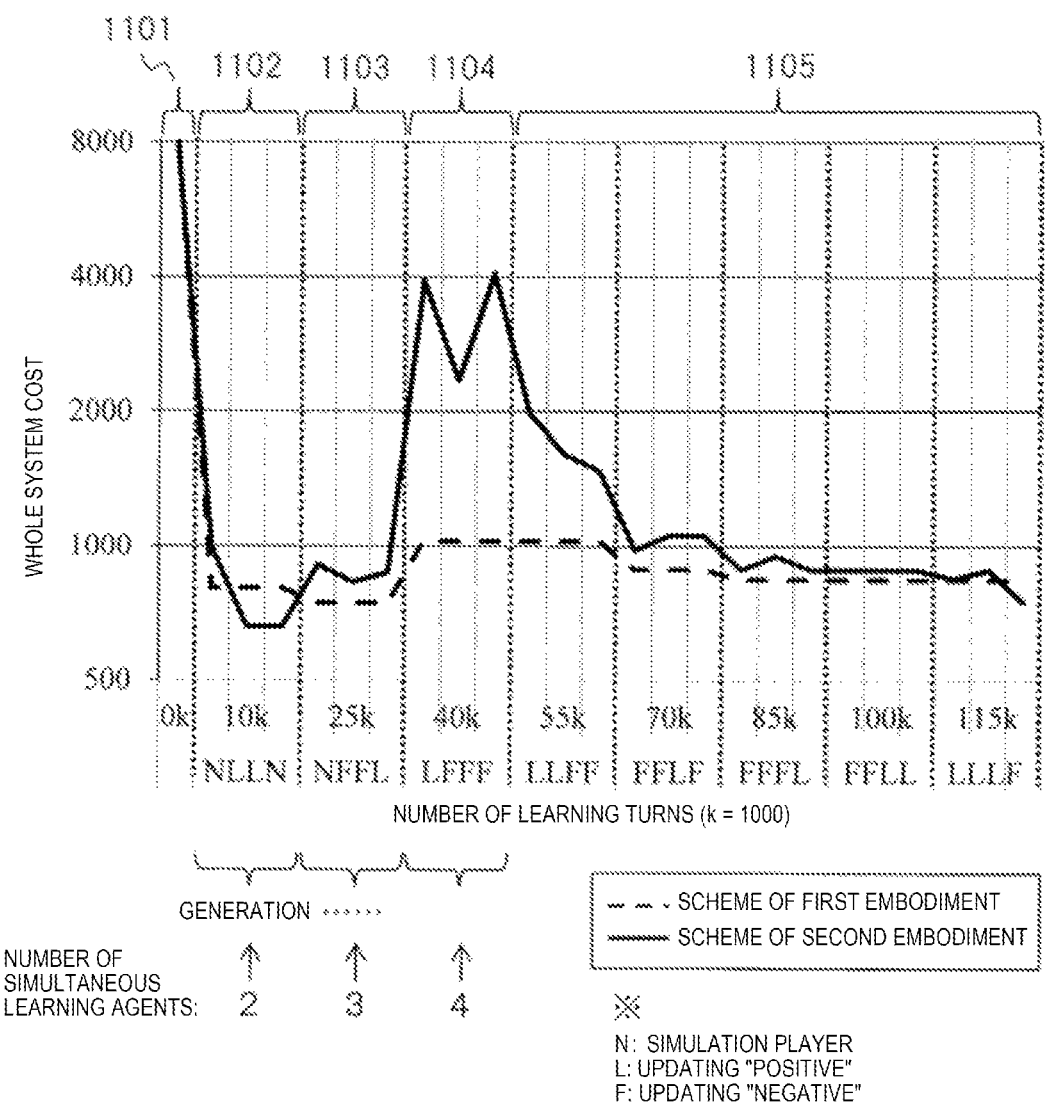

SYSTEM STRUCTURE EXAMPLE: MESH NETWORK TYPE (FIRST MODIFICATION EXAMPLE)

(SECOND MODIFICATION EXAMPLE)

(THIRD MODIFICATION EXAMPLE)

(FOURTH MODIFICATION EXAMPLE)

LEARNING CONTROL SYSTEM AND LEARNING CONTROL METHOD

CROSS-REFERENCE TO RELATED APPLICATION

This application claims priority to Japanese Patent Application No. 2017-172271 filed on Sep. 7, 2017, the entire contents of which are incorporated by reference herein.

BACKGROUND OF THE INVENTION

Field of the Invention

The present invention relates to an information processing technology and a technology for controlling or managing machine learning. In addition, the present invention relates to a technology for controlling learning such as multi-agent learning including a plurality of agents to achieve a task in a predetermined environment and reinforcement learning that determines output values to be output to a control target system based on an input value from a control target system.

Background Art

Social infrastructures include a wide variety of systems of supply chain management (SCM), energy grid (EG), transportation, finance, and the like and systems in which systems are complexly intertwined. Each system includes a plurality of subsystems. As technologies for optimizing the system and the subsystems based on information or data, technologies for learning control systems using machine learning have attracted attention. Each subsystem has information such as a situation in which a state, a restriction, or the like is different, a behavior, and a result target. Such information varies moment by moment. Therefore, there is a restriction even when all the information is designed or controlled by hands to optimize the system.

For such a general problem, control of the subsystem by machine learning is considered. To optimize performance of a subsystem, automatic control software called an agent is used. In a multi-agent system (MAS), a plurality of agents corresponding to a plurality of subsystems are used. Each agent autonomously controls each subsystem. Each agent has a control model that determines an operation. A purpose of the MAS is to optimize the whole system. In the MAS, it is necessary to determine parameters of the control model of the agent in order to control a target subsystem. The control model is equivalent to a function of determining output values to be output to a target in accordance with an input value from the target.

In the related art, a scheme of using reinforcement learning (RL) was proposed as an automated scheme of adjusting parameters of a control model of an agent. For example, multi-agent reinforcement learning (MARL) is disclosed in L. Busoniu, R. Babuska, and B. D. Schutter, "A comprehensive survey of multiagent reinforcement learning", IEEE Tran. on Systems Man and Cybernetics Part C Applications and Reviews, Vol. 38, No. 2, pp. 156 to 172, (2008).

As a related technology example regarding a learning control system, JP-A-2014-99113 discloses that learning control is performed on a plurality of household electrical appliances in an autonomously distributed manner as a household electrical network system, a fault caused in extraction of sensors is solved, and optimum control of the plurality of household electrical appliances can be performed.

In MARL, when each agent performs trial and error on computation of reinforcement learning, the system becomes unstable, and thus the unstableness affects learning in some cases. For example, in the system disclosed in JP-A-2014-99113, an entity that performs learning control can obtain all of the information regarding each subsystem (for example, a household electrical appliance) and information regarding the trial and error of each agent as complete information. In this way, in the case of a situation in which the complete information regarding the subsystem, the unstableness by the trial and error of the agent is not problematic and learning of the plurality of agents can be performed.

On the other hand, in each system and each subsystem (for example, a retailer, a wholesaler, or a factory) such as SCM, information non-sharing in which some or all of the information is not shared according to a contract or the like between systems or subsystems is assumed. That is, a system such as SCM is set as a target, and incomplete information is assumed between the plurality of agents in a system performing multi-agent learning such as MARL. Therefore, when unstableness occurs due to trial and error of learning of each agent, learning of the whole system becomes inefficient and optimization of the whole system is not realized in some cases. In the learning control system, it is necessary to appropriately control the multi-agent learning under the incomplete information. In a structure in which the complete information is assumed as in JP-A-2014-99113, countermeasures against a problem under the incomplete information may not be taken. Therefore, other countermeasures are necessary.

Under the incomplete information, MAS and the learning control system predict behaviors of other agents viewed from certain agents with restricted information and determine output values to be output from the agents to the subsystems. Thus, optimization of each subsystem and the whole system is achieved. However, optimization of each subsystem and optimization of the whole system do not necessarily match one another. Alternatively, when the whole system is optimized, there is a possibility of some of the subsystems being in a risk. Accordingly, since the control models of the agents of certain subsystems are not updated under the incomplete information, the whole system is not optimized and learning stagnation occurs due to occurrence of a balanced state. Accordingly, in order to optimize the whole system, countermeasures against a balanced state and learning stagnation are necessary.

An objective of the invention is to provide a technology for improving learning efficiency even under incomplete information and achieving optimization of a whole system with regard to a technology for a learning control system controlling multi-agent learning or the like.

SUMMARY OF THE INVENTION

According to a representative embodiment of the invention, there is provided a learning control system that has the following configuration.

According to an embodiment, a learning control system configured on a computer system and controlling multi-agent learning includes: a plurality of agents that are provided in a plurality of subsystems of a predetermined system, respectively, and perform learning to control the subsystems which are control targets using control models; and a learning management agent that is connected to the plurality of agents for communication and manages and controls learning of each agent. The agent receives information including the control model from the learning management agent, calculates an evaluation value of the subsystem based on a state value of the control target subsystem, inputs the state value, determines a behavior value of the subsystem through calculation of the control model, and outputs the behavior value to the subsystem, updates a parameter of the control model in accordance with the learning, and transmits information including the control model and the evaluation value to the learning management agent. The learning management agent constructs a plurality of experiment systems including a plurality of control model sets in the plurality of agents in a state in which the plurality of agents are connected to the plurality of subsystems and controls the learning in a plurality of generations in the plurality of experiment systems, and evaluates the plurality of experiment systems of a current generation based on the evaluation values of the plurality of subsystems, determines a plurality of updating control model sets in the plurality of experiment system of a next generation based on an evaluation result, and transmits information regarding the corresponding control models to the corresponding agents.

According to a representative embodiment of the invention, it is possible to improve learning efficiency even under incomplete information and achieve optimization of a whole system with regard to a technology for a learning control system controlling multi-agent learning or the like.

BRIEF DESCRIPTION OF THE DRAWINGS

FIG. 13 is a diagram illustrating a change example of an updating control model according to the third embodiment.

FIG. 14 is a diagram illustrating a learning result and a screen display example according to the third embodiment.

FIG. 15 is a diagram illustrating a case of a mesh network type as a system structure example according to a modification example of the first embodiment or the like.

FIG. 16 is a diagram illustrating a case of a nest type as a system structure example according to a modification example of the first embodiment or the like.

FIG. 17 is a diagram illustrating a configuration of a learning control system according to a first modification example of the first embodiment of the like.

FIG. 18 is a diagram illustrating a configuration of a learning control system according to a second modification example of the first embodiment of the like.

FIG. 19 is a diagram illustrating a configuration of a learning control system according to a third modification example of the first embodiment of the like.

FIG. 20 is a diagram illustrating a configuration of a learning control system according to a fourth modification example of the first embodiment of the like.

DETAILED DESCRIPTION OF THE INVENTION

Figure 1:
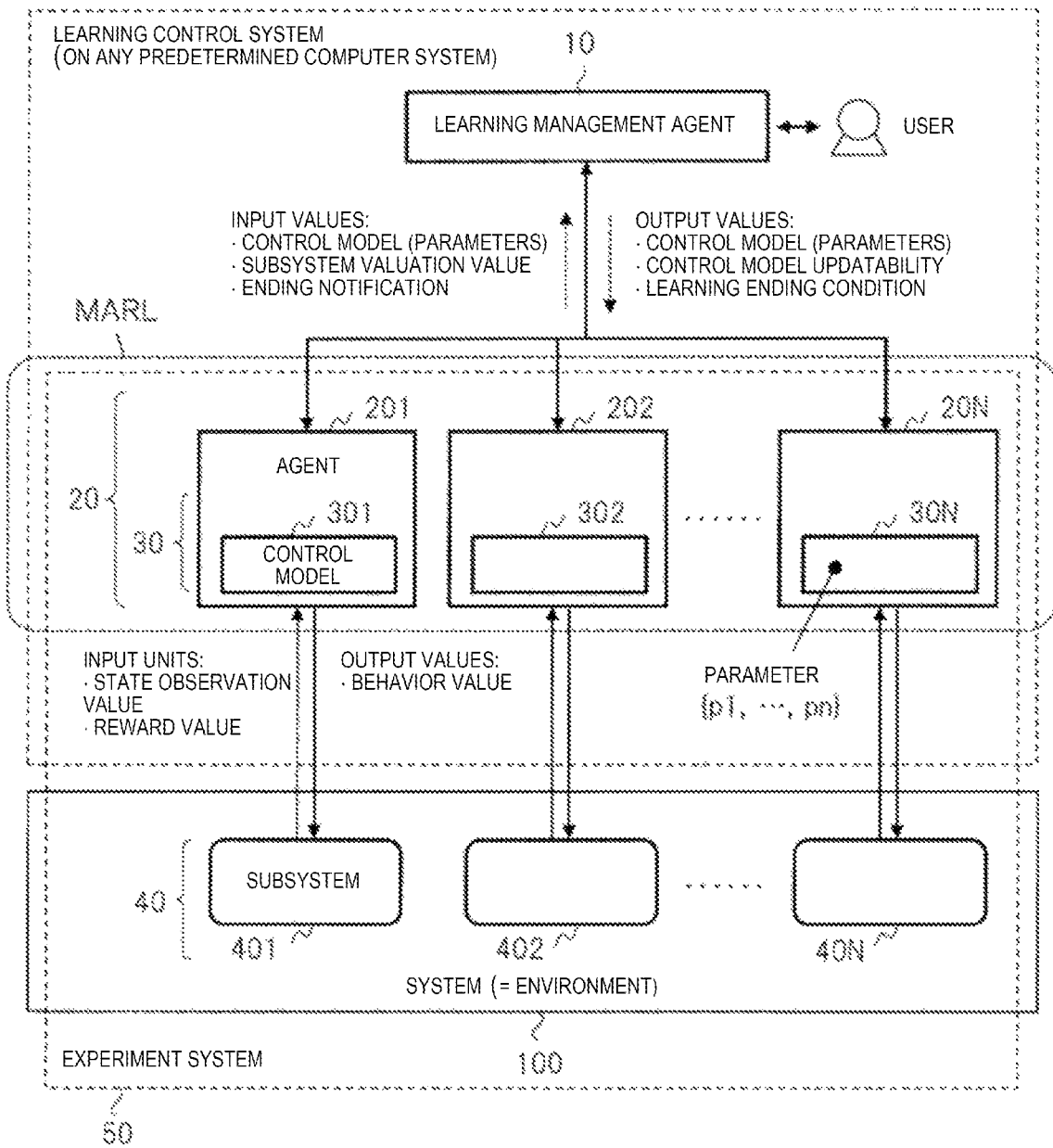
FIG. 1 is a diagram illustrating a configuration of a learning control system according to a first embodiment of the invention.

Hereinafter, embodiments of the invention will be described in detail with reference to the drawings. Throughout all the drawings used to describe the embodiments, the same reference numerals are given to the same units in principle and the repeated description will be omitted.

First Embodiment

A learning control system and method according to the first embodiment of the invention will be described with reference to FIGS. 1 to 9. The learning control method according to the first embodiment is a method including steps performed on the learning control system according to the first embodiment.

The learning control system according to the first embodiment is an autonomous distributed learning control system that manages and controls MARL in which a system such as SCM is a control target. In the first embodiment, an information non-sharing situation in which some or all of the information is not shared between subsystems of a control target system is assumed, and a situation of incomplete information between corresponding agents is assumed. The learning control system achieves optimization of each subsystem and optimization of the whole system by controlling learning of each agent such that the learning is efficient even under incomplete information. The learning control system has a structure for breaking a balanced state to improve learning stagnation even when the balanced state is maintained with optimization of the subsystem and achieving the optimization of the whole system.

Learning Control System (1)

FIG. 1 illustrates a whole configuration including the learning control system according to the first embodiment. As a whole, the learning control system according to the first embodiment is provided in a system 100. The learning control system according to the first embodiment is configured on any predetermined computer system. The learning control system according to the first embodiment includes one learning management agent 10 and a plurality (assumed to be N) of agents 20 {201 to 20N}. The learning management agent 10 and each agent 20 are connected to each other for communication.

The system 100 is a predetermined system or an environment of a control target. The system 100 includes a plurality (assumed to be N) of subsystems 40 {401 to 40N}.

The system 100 is a reinforcement learning environment of MARL. The system 100 is, for example, an SCM system to be described below.

The agent 20 is a subsystem agent that performs learning to control the subsystem 40. The agent 20 {201 to 20N} includes a control model 30 {301 to 30N} to control the subsystem 40. The plurality of agents 20 {201 to 20N} are connected to the plurality of corresponding subsystems 40 {401 to 40N}, respectively. The agent 20 and the subsystem 40 have a one-to-one relation. Each agent 20 has the same configuration and learning content obtained using the control model 30 is different.

The agent 20 performs learning on the corresponding subsystem 40 based on the control model 30 and controls the subsystem 40 according to a learning result. The agent 20 controls a behavior (for example, commodity ordering) of the subsystem 40. The agent 20 obtains an output value to be output to the subsystem 40 through calculation in the control model 30 based on an input value obtained from the subsystem 40. Each control model 30 is expressed as parameters {p1, . . . , pn}. The parameters of the control model 30 are updated according to learning.

The learning management agent 10 is an agent that manages and controls learning of the plurality of agents 20. The learning management agent 10 achieves optimization of the system 100 through learning control of the agents 20. The learning management agent 10 manages a plurality of experiment systems 50 including the plurality of agents 20 and the system 100. The learning management agent 10 manages an experiment in the experiment system 50 for each generation in a time series. The experiment in the experiment system 50 is formed by repeating learning a plurality of times. Learning content of each experiment system 50 differs.

The learning management agent 10 acquires the control models in a current state, subsystem evaluation values, and the like as input values from the agents 20. The learning management agent 10 calculates a whole system evaluation value of the system 100 based on the evaluation values of the subsystems of the agents 20. The learning management agent 10 determines whether to update the control model 30 of each agent 20 based on the whole system evaluation value and selects the control model 30 to be applied to the experiment system 50 of a next generation. The learning management agent 10 transmits information regarding the updating control model 30 of the next generation, control model updatability information, and information including a learning ending condition to the agents 20, as output values to be output to the agents 20.

The learning management agent 10 selects a combination or the number of the agents 20 simultaneously performing learning for each generation and performs updating the parameters of the control model 30 of each agent 20 based on the whole system evaluation value.

Communication (communication between the agents, as will be described below) is performed in accordance with a predetermined scheme and predetermined information is input and output between the learning management agent 10 and each agent 20. The learning management agent 10 and each agent 20 include a communication interface for the communication. The communication is performed on an existing communication network and communication interface devices.

In FIG. 1, a system that performs an experiment through machine learning in the system 100 in a state in which the agents 20 are connected to the subsystems 40 is referred to as the experiment system 50. The learning management agent 10 manages experiments in the plurality of experiment systems 50.

The learning management agent 10 selects an optimum control model based on the whole system evaluation value in results of the experiments in a certain generation and updates the control model as initial setting values for the experiments of the next generation. The learning management agent 10 automatically delivers information regarding the control models of the next generation to each agent 20 and updates the control model 30 of each agent 20.

Learning Control System (2)

An overview of an operation or the like of the learning control system will be described. The agent 20 acquires a state observation value of the system 100 by the subsystem 40 via the corresponding subsystem 40 and acquires a state value of the subsystem 40 from the state observation value. The agent 20 obtains a control value or a behavior value of the subsystem 40 by calculating the control model 30 based on the state value. The agent 20 obtains a behavior value of the subsystem 40 based on the control value. The agent 20 outputs the behavior value as an output value to the corresponding subsystem 40.

Thus, the subsystem 40 moves as a behavior in the system 100 based on the behavior value. As a result, the agent 20 acquires a subsequent state observation value from the subsystem 40 and determines a reward value of the subsystem 40 based on the state observation value.

The agent 20 calculates an evaluation value of the corresponding subsystem 40 based on a predetermined index. The index is an index for each problem applied to the subsystem 40. The index is, for example, an index for minimizing a cost related to commodity ordering by a retailer.

The agent 20 transmits information including an evaluation value of the subsystem 40 (referred to as a subsystem evaluation value) and information (specifically, a parameter) indicating the control model 30 in the current state to the learning management agent 10.

The agent 20 performs learning based on the calculated behavior value or the like and updates the parameter of the control model 30.

The learning management agent 10 receives information such as the subsystem evaluation value and the control model from each agent 20. The learning management agent 10 calculates an evaluation value related to the whole system 100 (referred to as a whole system evaluation value) from each subsystem evaluation value through predetermined calculation. The learning management agent 10 determines the updating of the control model 30 based on the whole system evaluation value through a process to be described below. The learning management agent 10 transmits information including the control model 30 for updating and setting in the agent 20 and the control model updatability information to the agent 20.

The control model updatability information is a value for setting whether the control model 30 is updatable or not updatable for each generation in each of the plurality of agents 20. The learning management agent 10 changes the agent 20 so that the control model 30 is updatable between the generations. Thus, a balanced state in which the control model 30 is not updated is broken and optimization of the whole system is achieved.

Learning Control System (3)

Figure 2:
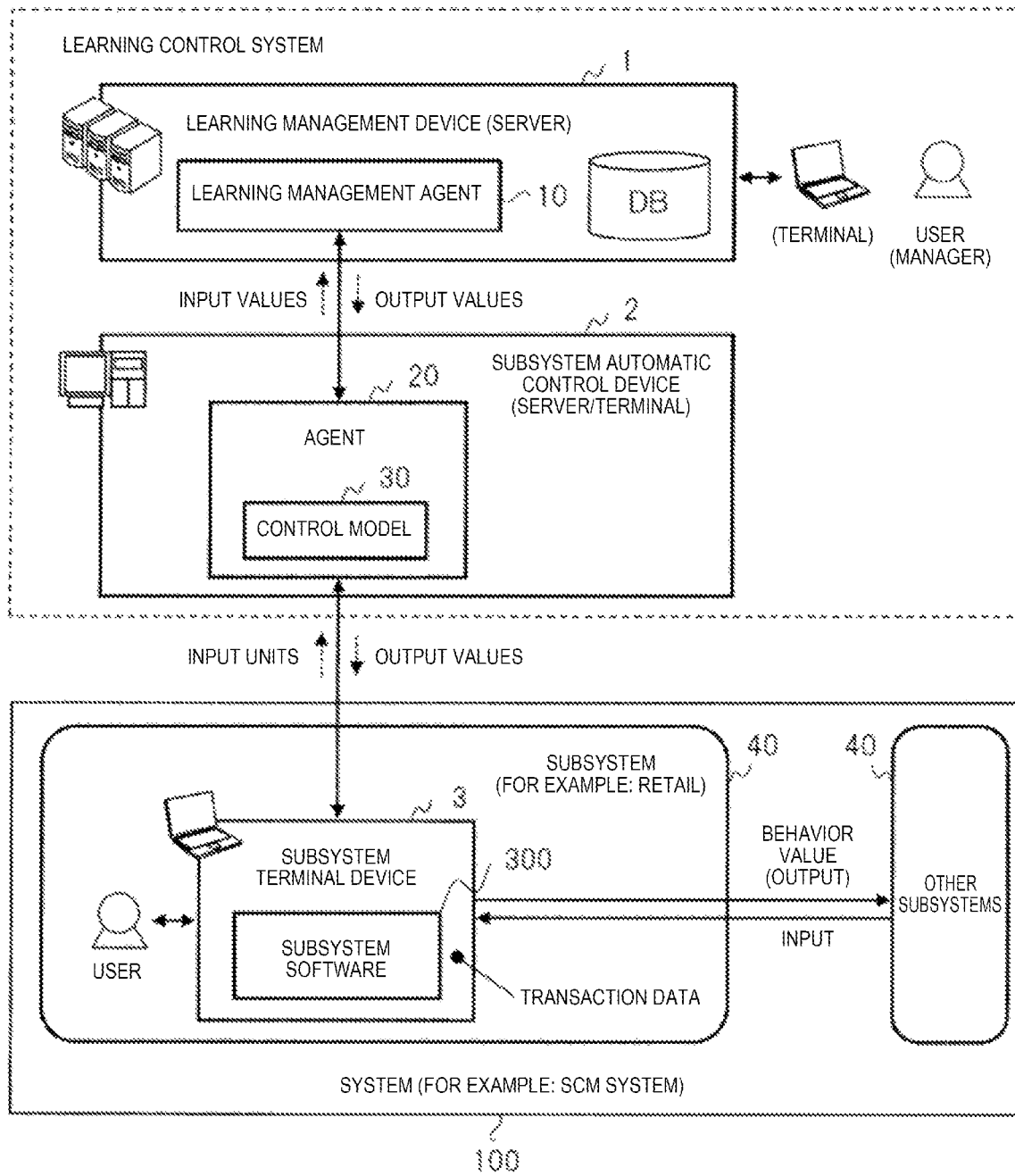
FIG. 2 is a diagram illustrating a device configuration example of the learning control system according to the first embodiment of the invention.

FIG. 2 illustrates a device configuration example of the learning control system according to the first embodiment. That is, a mounting example of a computer system is illustrated. The learning control system includes a learning management device 1 and a plurality of subsystem automatic control devices 2 which are connected for communication. In FIG. 2, a configuration of the single subsystem 40 is illustrated and the others are omitted. The learning management agent 10 and the agent 20 can be configured on, for example, a general-purpose computer.

The learning management agent 10 is mounted on the learning management device 1. The learning management device 1 is configured by, for example, a server of a cloud system by a service provider and realizes the learning management agent through software program processing. The learning management device 1 includes a DB that stores information or data treated by the learning management agent 10. The DB may be configured with by an external DB server. A terminal device of the user such as a manager who manages the learning control system is connected to the learning management device 1. The user such as a manager operates the terminal device and accesses the learning management device 1 to perform an input and an output such as an instruction input, system setting, or learning result confirmation.

The agent 20 is mounted on the subsystem automatic control device 2. The subsystem automatic control device 2 is configured with, for example, a server or a terminal device and realizes the agent 20 through software program processing.

A general hardware configuration can be applied to each device of the learning management device 1 and the subsystem automatic control device 2. Each device includes a calculation unit configured with, for example, a CPU, a ROM, a RAM, and the like, a storage unit which can be configured with a ROM, an HDD, an SSD, or the like, a predetermined communication interface device, an input and output interface device, an input device, and a display device. Each device is configured with a plurality of computers according to a learning calculation load or the like and may perform parallel calculation or the like. Each communication unit to be described below performs a communication process on the communication interface device.

The subsystem 40 includes a subsystem terminal device 3. A general PC or the like can be applied to the subsystem terminal device 3. The subsystem 40 may further include a LAN or a server. The subsystem terminal device 3 includes subsystem software 300. The subsystem software 300 is predetermined software that manages the subsystem 40 and performs an input and an output from and to another subsystem 40. For example, when the system 100 is an SCM system and the subsystem 40 is a retailer, the subsystem software 300 is software that manages commodities or ordering. The user such as person charged in the subsystem 40 operates the subsystem terminal device 3 and conducts business. The subsystem terminal device 3 retains transaction data or the like with the other subsystems 40 and transmits information (state observation value or the like) regarding transaction data or part of the transaction data to the subsystem automatic control device 2. The subsystem terminal device 3 receives the behavior value from the subsystem automatic control device 2 and control a behavior (for example, ordering) in transaction with the other subsystems 40 based on the behavior value.

There is the user for each the subsystem automatic control device 2 of each subsystem 30. The user may perform an input and an output from or to the agent 20 of the subsystem automatic control device 2. For example, a screen is displayed for the user for each subsystem automatic control device 2, and setting, a learning state, or the like of the agent 20 can be confirmed.

The learning management agent 10 displays various kinds of information on the screen by a GUI unit 15 based on data stored in a DB unit 14 to be described. The agent 20 may display various kinds of information on the screen based on data stored in a data storage unit 24.

For example, the whole system evaluation value may be displayed for each experiment system 50 for each generation (at least, a current generation) may be displayed on the screen supplied by the learning management agent 10 or the agent 20. For example, the whole system evaluation value, the subsystem evaluation value, and information regarding the optimum control model 30 for each generation may be displayed.

System Configuration Example

Figure 3:
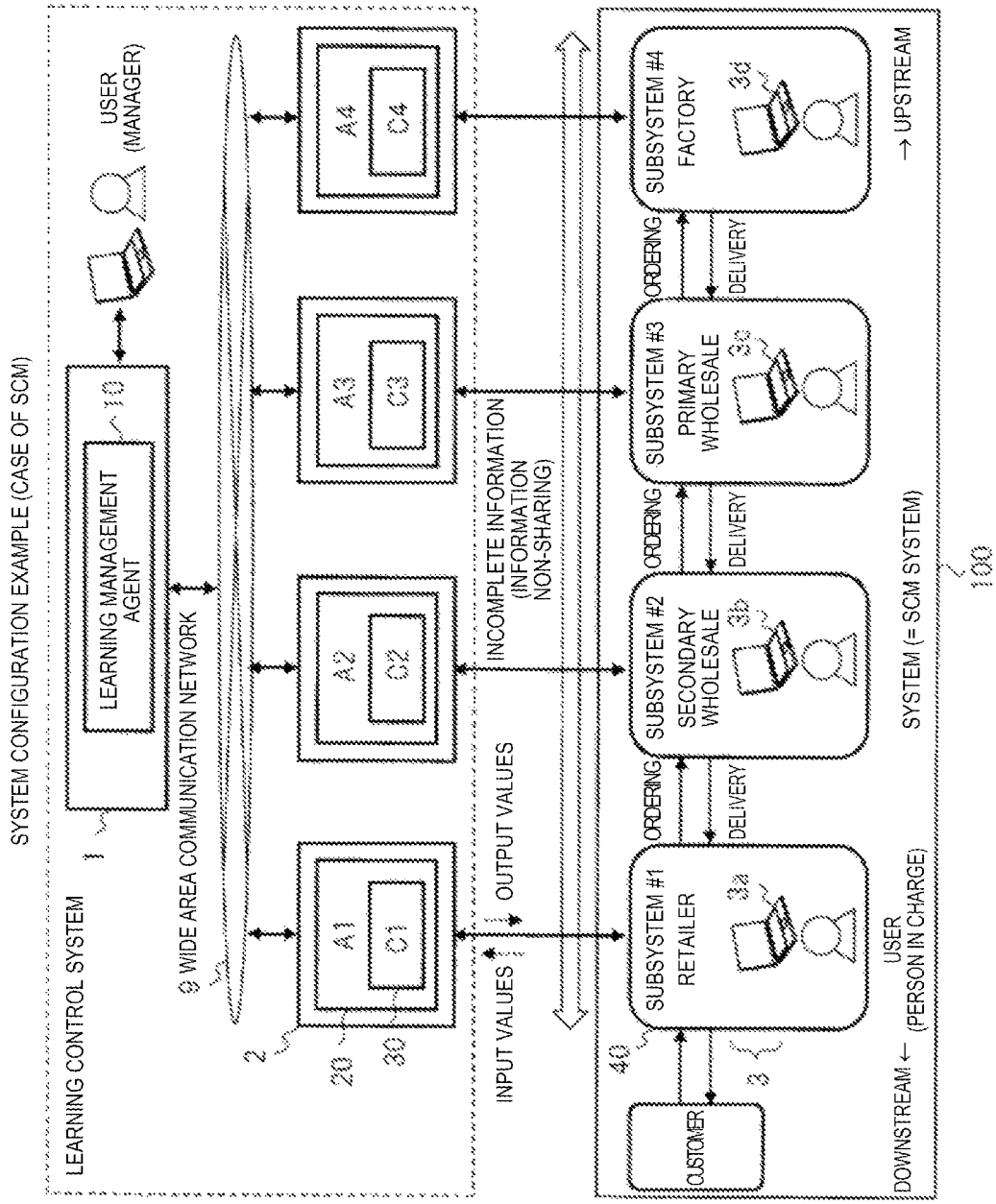
FIG. 3 is a diagram illustrating a case of SCM as a configuration example of the system according to the first embodiment.

FIG. 3 illustrates a case applied to the SCM as a configuration example of the system 100 according to the first embodiment. In FIG. 3, the system 100 is an SCM system. In the learning control system in FIG. 3, the SCM system is set as a control target. In this example, to facilitate the description, the SCM system treating one kind of commodity is configured, but the same applies to a case in which a plurality of commodities are treated. The system 100 includes a plurality (four) of subsystems 40, a retailer (subsystem #1), a secondary wholesaler (subsystem #2), a primary wholesaler (subsystem #3), and a factory (subsystem #4) which are connected in series from the downstream to the upstream. A customer connected to the retailer is not considered as the subsystem 40.

Each subsystem 40 (the retailer or the wholesaler) takes a commodity delivered from one upstream subsystem 40. Here, since the factory is on the uppermost stream, the factory produces and takes commodities. Each subsystem 40 (the factory and the wholesalers) receives ordering (an ordering label) from one downstream subsystem 40 and delivers the ordering label and the number of commodities equivalent to a remaining received order by the existence amount from the stock to one downstream subsystem 40. Each subsystem 40 determines an ordering amount so that a sum of the stock and the remaining received order decreases and transmits the ordering label to one upstream subsystem 40. Here, since the factory is on the uppermost stream, the factory processes a production amount of the factory.

The SCM system performs the series of processes. An ordering delay occurs in upstream delivery of the ordering label and a delivery delay occurs in downstream delay of commodities. Accordingly, when an ordering label is transmitted from a customer to a retailer, the ordering label is propagated from the retailer in the ordering delay, is subsequently transmitted to the secondary wholesaler, is subsequently transmitted to the primary wholesaler, and is finally propagated to the factory. In contrast, a commodity is transmitted from the factory in the delivery delay according to the ordering label, is subsequently transmitted to the primary wholesaler, is subsequently transmitted to the secondary wholesaler, and is subsequently transmitted to the retailer. Finally, the commodity arrives at the customer. In this example, in unit (referred to as a turn) between a certain time T and a subsequent time T+1 on learning calculation, a series of operations of arrival, order reception, stock and remaining received order calculation, shipment, and ordering is referred to as one return.

In the SCM system, for example, based on a contract or the like, information non-sharing between the subsystems 40 except for input and output data of ordering is basically assumed and incomplete information between the corresponding agents 20 is assumed.

In the SCM system, it is known that it is generally difficult for each subsystem 40 to determine an ordering amount so that the stock amount and the number of remaining received orders are suppressed. In this example, the agent 20 {A1 to A4} connected to the subsystems 40 and the learning management agent 10 connected to the agents 20 are cooperated. The agent 20 controls an ordering amount or a delivery amount of the corresponding subsystem 40 by learning. Thus, the control model 30 {C1 to C4} related to the ordering amount or the delivery amount of each subsystem 40 is acquired.

The agent 20 calculates cost as a subsystem evaluation value in order to optimize the subsystem 40. The cost is expressed as a weighted sum of the stock amount and the remaining received orders of the subsystem 40. Each agent 20 learns the control model 30 so that the cost of the corresponding subsystem 40 is as small as possible. The learning management agent 10 calculates the cost of the SCM system as the whole system evaluation value in order to optimize the SCM system. The learning management agent 10 calculates the whole system evaluation value based on the subsystem evaluation value from each agent 20.

Each subsystem 40 {#1 to #4} includes the subsystem terminal device 3 {3a to 3d}. The subsystem terminal device 3 transmits the transaction data or the like to the corresponding subsystem automatic control device 2. The agent 20 of each subsystem automatic control device 2 sets the transaction data or the like received from the subsystem terminal device 3 as an input value and performs reinforcement learning using the control model 30. The subsystem automatic control device 2 belongs to, for example, the corresponding subsystem 40. The subsystem automatic control device 2 may be installed inside or outside of the subsystem 40.

The learning management device 1 is connected for communication to the subsystem automatic control device 2 of each subsystem 40 via a wide area communication network. The learning management device 1 receives control model information or the like of the learning result from each subsystem automatic control device 2. For example, the service provider manages the learning management device 1 and each subsystem automatic control device 2.

Learning Management-Plurality of Experiment Systems

Figure 4:
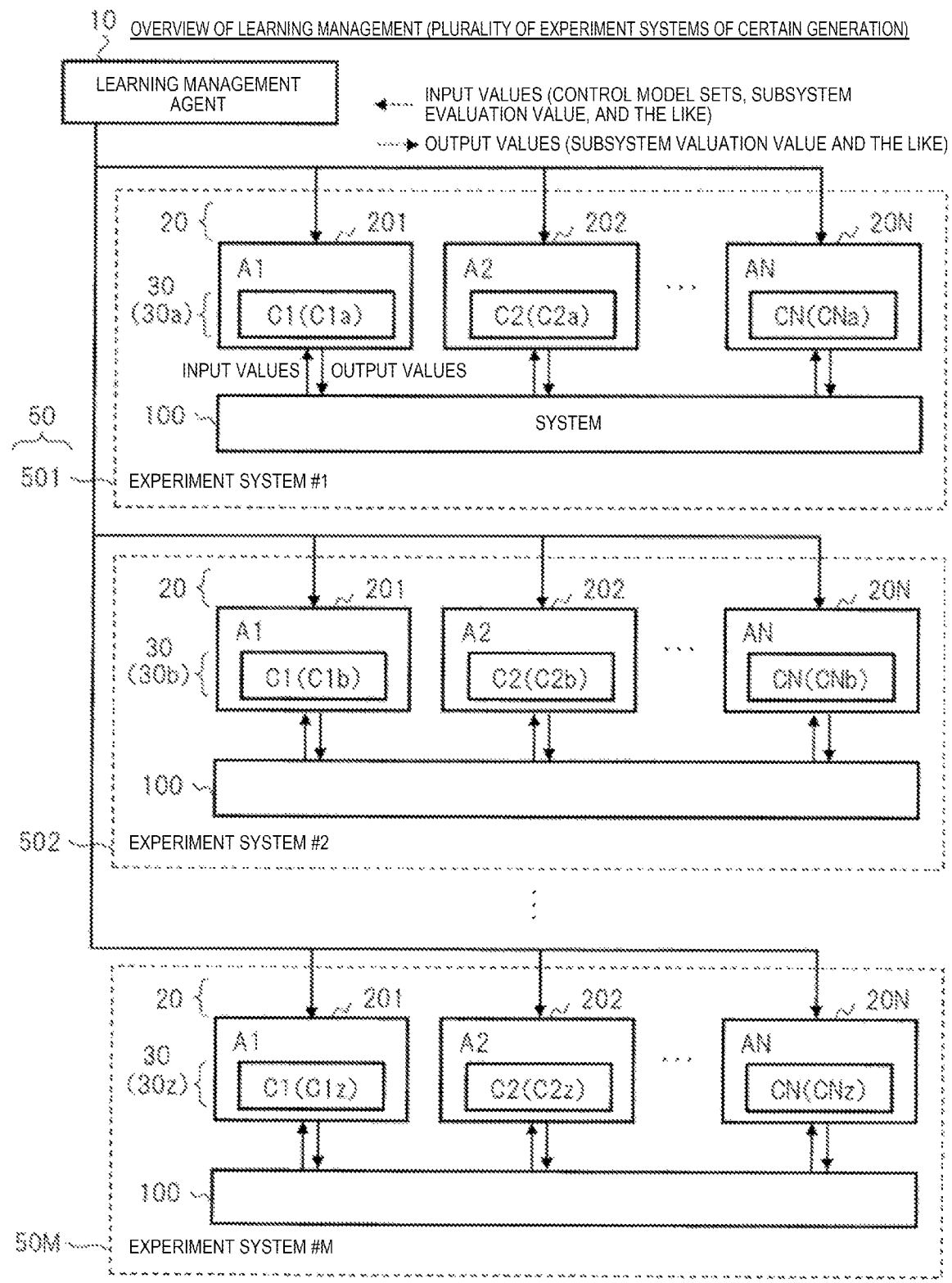
FIG. 4 is a diagram illustrating a plurality of experiment systems as an overview of learning management according to the first embodiment.

FIG. 4 illustrates a configuration of a plurality (M) of experiment systems 50 {501 to 50M} in a certain generation as an overview of the learning management in the learning control system. The experiment systems 501(#1), 502 (#2), . . . , 50M (# M) are included as the plurality of experiment systems 50. The learning management agent 10 configures the plurality of experiment systems 50 and manages experiments.

Each experiment system 50 is defined as a learning set of the control models 30 {C1, C2, . . . , CN} of the plurality (N) of agents 20 {201 (A1), 202 (A2), . . . , 20N (AN)} connected to the system 100 (the plurality of subsystems 40 are not illustrated). The state and learning content of the control model 30 of each experiment system 50 can differ. In the example of FIG. 4, in the experiment system 501 (#1), states of the control models C1 to CN of the agents A1 to AN are expressed control models 30a {C1a to CNa}. Similarly, in the experiment system 502 (#2), states of the control models C1 to CN of the agents A1 to AN are expressed control models 30b {C1b to CNb}. In the experiment system 50M (# M), states of the control models C1 to CN of the agents A1 to AN are expressed control models 30z {C1z to CNz}.

Each experiment system 50 performs an experiment in a predetermined learning story a predetermined number of times (referred to as the number of experiments). The predetermined learning story is formed by, for example, a plurality of episodes and the episode is formed by a plurality of turns. The predetermined learning story is defined as follows. First, a state observation value, a behavior value, and a reward value at a certain time T are set as first-turn information. Similarly, a state observation value, a behavior value, and a reward value at a subsequent time T+1 are set as second-turn information. Any predetermined number of turns (for example, 50 turns) is defined as one episode. The fact that the episode is performed a predetermined number of times is defined as a predetermined learning story. Any resolution of one turn (a unit time between the time T and the time T+1) can be set. In the real world, for example, the resolution may be set as a 1-minute unit or a 1-day unit. In a simulator environment of a computer, when a separation of 1 turn is set, the separation of 1 turn can be used as the unit time.

An experiment in the predetermined learning story is defined as a generation. The number of repetitions of a generation is defined as the number of times of a generation. For each generation, experiments in the plurality of experiment systems 50 are repeated a predetermined number of experiments. The learning management agent 10 manages the number of generations, the number of experiments, or the like.

For the experiments of the plurality of experiment systems 50, a scheme of performing the experiments in sequence chronologically for each experiment system 50 (a sequential experiment scheme) may be used or a scheme of performing the experiments in parallel chronologically in the plurality of experiment systems 50 (a parallel experiment scheme) may be used. The learning management agent 10 manages the scheme and manages selection or order of the experiment systems 50 according to the scheme. In the case of the sequential experiment scheme, the learning management agent 10 constructs and operates the experiments of the plurality of experiment systems 50 {#1 to # M} one by one for each experiment of the predetermined learning story. For example, the learning management agent 10 acquires a result by first constructing experiment system #1 and performing the experiments, subsequently acquires a result by subsequently constructing experiment system #2 and performing the experiments, and acquires a result by finally constructing experiment system # M and performing the experiments. In the case of the parallel experiment scheme, the learning management agent 10 constructs and operates the plurality of experiments of the plurality of experiment systems 50 simultaneously in parallel based on a simulator environment or the like.

In the plurality of experiment systems 50, the control model 30 of each agent 20 can be set to be the same to perform the experiment and the control model 30 of each agent 20 can also be set to be different to perform the experiment. The learning management agent 10 manages the same and the difference of the control model 30 of each agent 20. Even when the experiment is performed using the same control model 30 in the plurality of experiment systems 50, the learning result is different.

In the experiment performed a plurality of times using the plurality of control models 30 of the plurality of agents 20 in the experiment system 50 of a certain generation, a combination, the number, an order, and the like of the agents 20 that simultaneously perform the learning are controlled. The learning management agent 10 controls selection, the number, a change order, and the like of the agents 20 that simultaneously perform the learning in the experiment system 50 for each generation and the agents 20 updating the control models 30.

A plurality of control model 30 {C1 to CN} sets in the plurality of agent 20 {A1 to AN} set are referred to as control model sets. The control model is expressed with parameters and the control model set is expressed with a parameter set.

Learning Management-Updating of Control Model Between Generations

Figure 5:
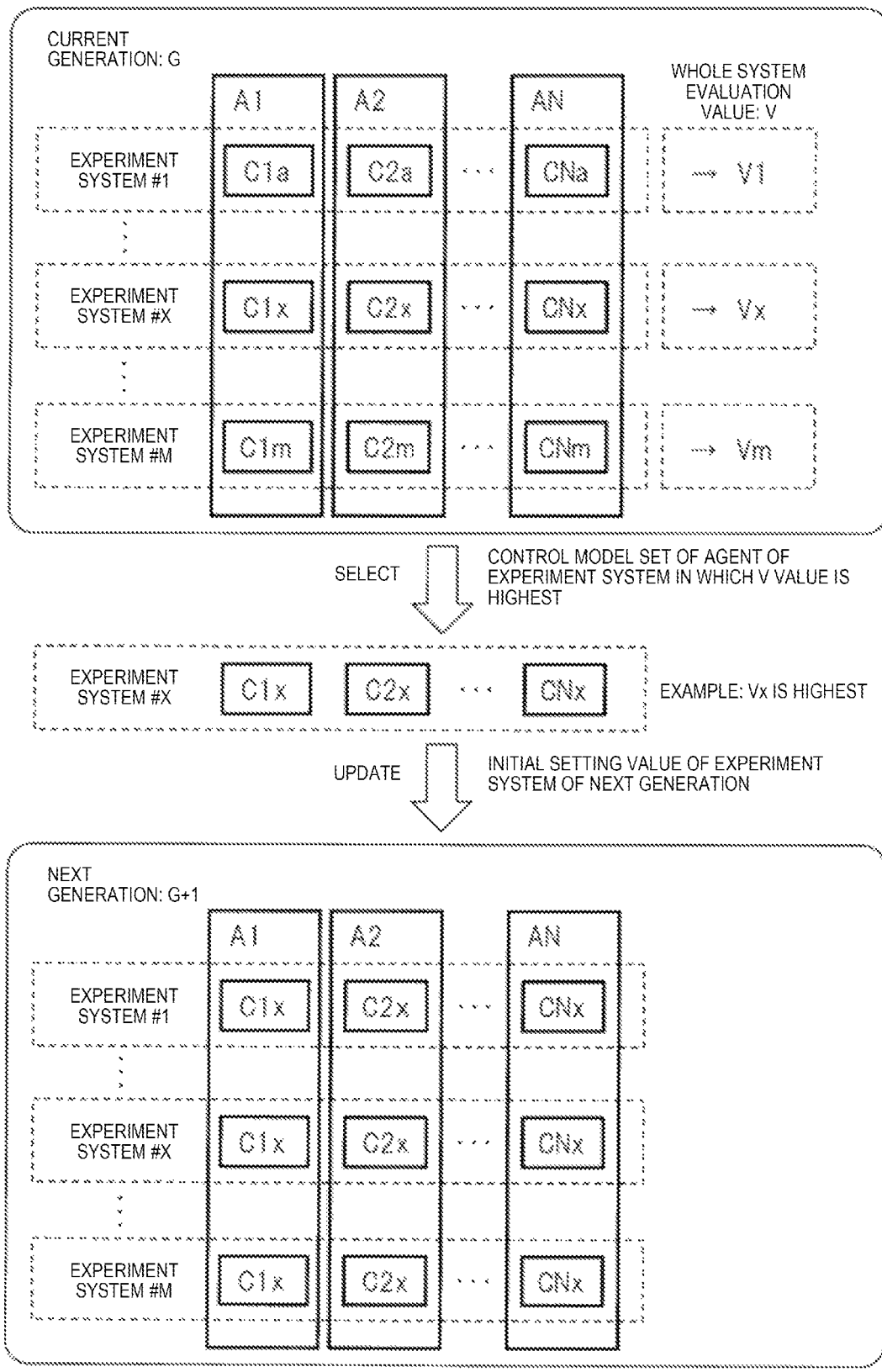
FIG. 5 is a diagram illustrating updating of a control model between generations according to the first embodiment.

Subsequently, FIG. 5 illustrates an updating overview of the control model 30 of the experiment system 50 between generations. FIG. 5 illustrates selection and updating of the control model set between a certain generation G (current generation) and a subsequent generation G+1.

Each agent 20 of the experiment system 50 transmits the subsystem evaluation value and the control model information of the current generation to the learning management agent 10 after an operation of the plurality of experiments in the certain generation G (the current generation) ends. Thus, the learning management agent 10 acquires each subsystem evaluation value in each experiment system. 50 and control model set information of the current generation. The learning management agent 10 calculates the whole system evaluation value from each subsystem evaluation value through predetermined calculation. For example, a whole system evaluation value V1 of experiment system #1, a whole system evaluation value Vx of experiment system # X, and a whole system evaluation value Vm of experiment system # M are illustrated.

The learning management agent 10 determines the experiment system 50 in which the whole system evaluation value in the current generation is the highest based on the whole system evaluation value of each experiment system 50. The learning management agent 10 selects the control model set of the experiment system 50 from the determination result. For example, the whole system evaluation value Vx is assumed to be the highest value. The selected experiment system 50 and the control model set are expressed with the experiment system # X and the control model {C1x, C2x, . . . , CNx}. The learning management agent 10 updates the control model 30 using the selected control model set as an initial setting value of the control model set of each of the plurality of experiment systems 50 of the next generation G+1. The learning management agent transmits each piece of control model information corresponding to the control model set information to the corresponding agent 20 {A1 to AN}.

The agent 20 of each experiment system 50 updates the setting of the control model 30 of the agent 20 based on the received control model information. Thus, each experiment system 50 performs the experiment of the next generation using the updated control model set. Thereafter, the experiment is repeated similarly for each generation.

According to the first embodiment, the control model 30 of each agent 20 is automatically updated for each generation, as described above. As a modification example, the updating confirmation by the user may be performed when the control model 30 of each agent 10 is updated for each generation. For example, the learning management device 1 may perform the updating when updating confirmation information is displayed on a screen and the user performs a confirmation operation input.

Functional Block Configuration

Figure 6:
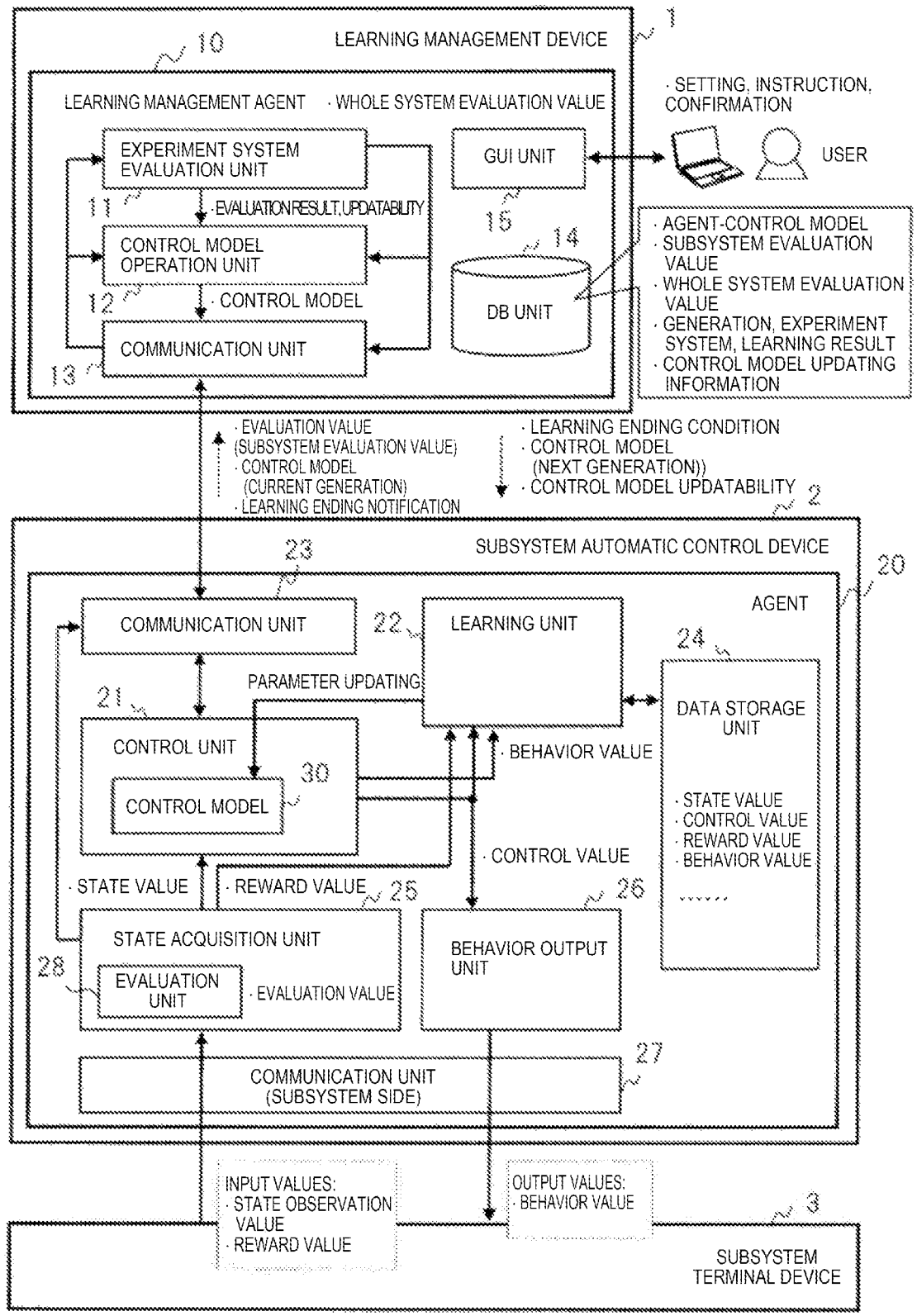
FIG. 6 is a diagram illustrating a functional block configuration according to the first embodiment.

FIG. 6 illustrates a functional block configuration of the learning control system according to the first embodiment. The learning management agent 10 includes an experiment system evaluation unit 11, a control model operation unit 12, a communication unit 13, a DB unit 14, and a GUI unit 15 as a functional block.

The experiment system evaluation unit 11 manages the plurality of experiment systems 50. The experiment system evaluation unit 11 calculates the whole system evaluation value based on the subsystem evaluation value received from each agent 20 of each experiment system 50. The experiment system evaluation unit 11 determines the experiment system 50 in which the whole system evaluation value is the highest from the plurality of experiment systems 50. The experiment system evaluation unit 11 determines whether to perform learning of each agent 20 in the experiment of each experiment system 50, that is, whether to update the control model 30.

The control model operation unit 12 selects the control model set of the experiment system 50 in which the whole system evaluation value is the highest in the plurality of experiment systems 50 of the current generation based on an evaluation result (the whole system evaluation value or the like) of the experiment system evaluation unit 11. The control model operation unit 12 updates the control model 30 so that the selected control model set is set to an initial setting value of the control model set of the plurality of experiment systems 50 of the next generation.

The communication unit 13 performs a communication process with each agent 20 of each experiment system 50. The communication unit 13 receives information including the control model information of the current generation and the subsystem evaluation value from the agent 20. The communication unit 13 transmits information including updating control model information of the next generation, whether to update the control model, and a learning ending condition to each agent 20. The learning ending condition is information for notifying of an ending condition of the experiment in the experiment system 50 for each generation.

The DB unit 14 stores each piece of information or data related to the learning control. The DB unit 14 stores, for example, information regarding each control model 30 of each agent 20, the subsystem evaluation value of each subsystem 40, the whole system evaluation value of the system 100, learning result information of each experiment system 50 of each generation, and control model updating information. The control model updating information is information indicating how the control model 30 is updated between the generations based on the control model updatability information.

The GUI unit 15 supplies a screen which is a graphical user interface (GUI) for a user (manager). The GUI unit 15 supplies, for example, a web page screen. The GUI unit 15 displays various kinds of information on the screen and receives a user input on the screen. The user can input user setting, setting regarding learning content, an instruction, and the like on the learning control system and can confirm a learning state, a result, and the like while viewing the screen.

The agent 20 includes a control unit 21, a learning unit 22, a communication unit 23, a data storage unit 24, a state acquisition unit 25, a behavior output unit 26, and a communication unit 27 as a functional block. The state acquisition unit 25 includes an evaluation unit 28.

The control unit 21 controls calculation by the control model 30 and identifies the control model 30 by learning.

The control unit 21 inputs a state value to the control model 30 and outputs a control value or a behavior value through calculation of the control model 30.

The learning unit 22 performs learning based on the behavior value and the control value from the control unit 21 and the reward value from the state acquisition unit 25 and updates the parameters of the control model 30 of the control unit 21.

The communication unit 23 performs a communication process with the learning management agent 10 under the control of the control unit 21. The communication unit 23 transmits information including, for example, the control model information, the subsystem evaluation value, and ending notification of the current generation to the learning management agent 10. The communication unit 23 receives information including the control model information, the control model updatability, and the learning ending condition of the next generation from the learning management agent 10. The ending notification is information for notifying of ending of the experiment of the experiment system 50 of each generation.

The data storage unit 24 stores information or data generated by the control unit 21, the learning unit 22, or the like. The data storage unit 24 stores the state value, the control value, the reward value, the behavior value, and the like.

The state acquisition unit 25 acquires the state observation value from the subsystem 40 and generates a state value to be input to the control unit 21 from the state observation value. The state acquisition unit 25 acquires the reward value from the subsystem 40.

The behavior output unit 26 generates a behavior value for a behavior of the subsystem 40 through predetermined conversion based on the control value from the control unit 21 and outputs the behavior value to the subsystem 40.

The communication unit 27 performs a communication process with the subsystem 40 under the control of the state acquisition unit 25 or the like. The communication unit 27 receives, for example, the state observation value or the reward value as input values from the subsystem 40. The communication unit 27 transmits, for example, the behavior value as an output value to the subsystem 40.

The evaluation unit 28 performs a predetermined evaluation process based on the reward value of the subsystem 40 and calculates a subsystem evaluation value.

Agent Process Flow

Figure 7:
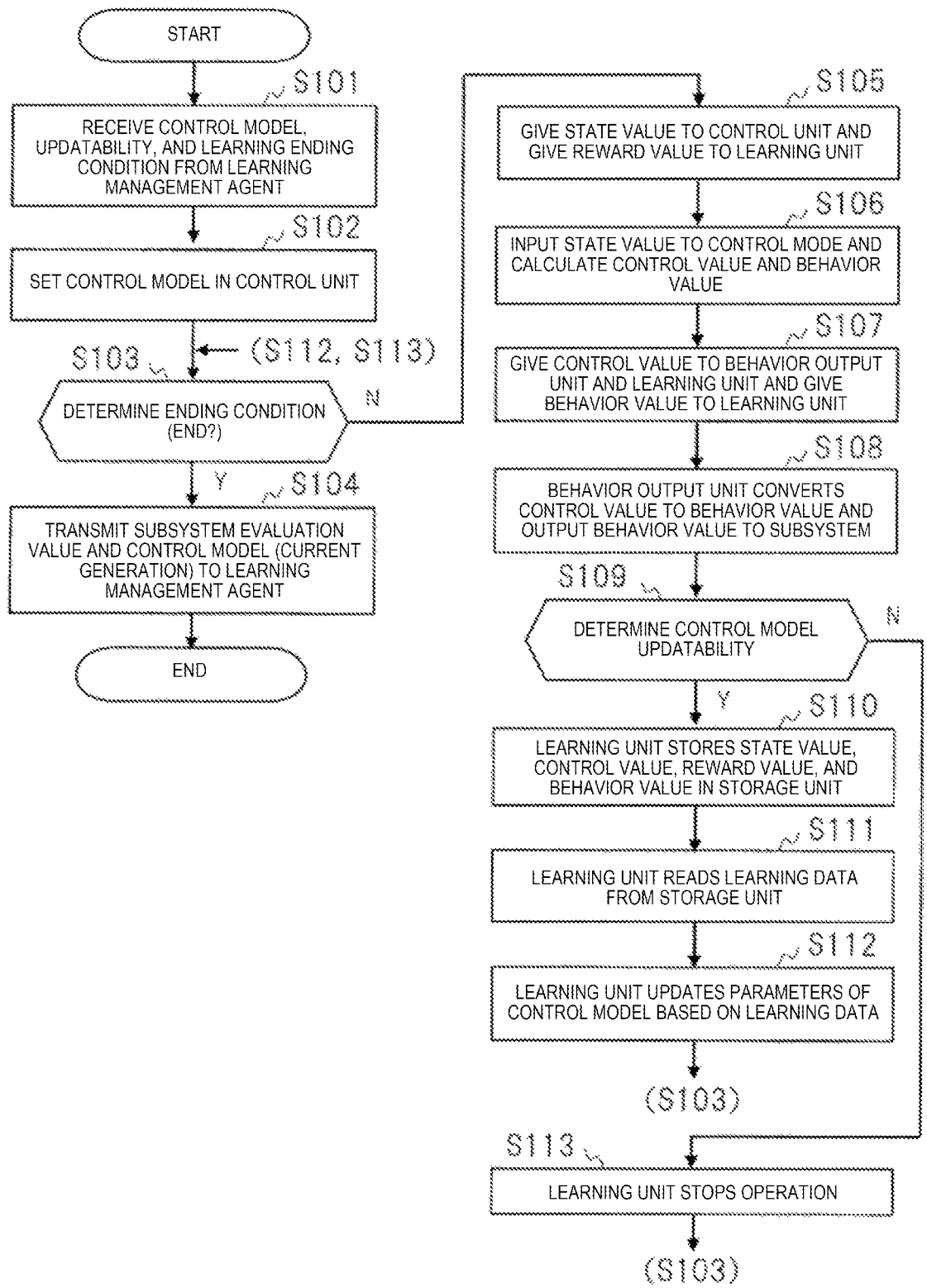
FIG. 7 is a diagram illustrating a process flow of an agent according to the first embodiment.

An operation of the agent 20 will be described with reference to FIG. 7. FIG. 7 illustrates a process flow of the agent 20. In FIG. 7, steps S101 and S113 are included. Hereinafter, the steps will be described in order.

(S101) The agent 20 uses the communication unit 23 to receive the information including the control model with the initial setting value, the information regarding whether to update the control model, and the learning ending condition from the learning management agent 10.

(S102) The agent 20 sets the received control model in the control model 30 of the control unit 21.

(S103) The agent 20 determines the ending condition based on the learning ending condition. When the determination result is an end (Y), the process proceeds to S104. When the determination result is not the end (N), the process proceeds to S105.

(S104) The agent 20 uses the communication unit 23 to transmit the information including the ending notification, the subsystem evaluation value, and the control model of the current generation in a state of the learning end time to the learning management agent 10, and then ends the operation.

(S105) On the other hand, in S105, the agent 20 temporarily stores data including a state value obtained by processing the state observation value in the state acquisition unit 25 in the data storage unit 24. The agent 20 gives the state value formed by data equivalent to the previous number of turns to the control unit 21 and gives the reward value to the learning unit 22.

(S106) The control unit 21 inputs the state value to the control model 30 and calculates the control value and the behavior value which are output values.

(S107) The control unit 21 gives the control value to the behavior output unit 26 and the learning unit 22 and gives the behavior value to the learning unit 22.

(S108) The behavior output unit 26 converts the control value to the behavior value and outputs the behavior value as an output value to the subsystem 40. At this time, the communication unit 27 transmits the output value to the subsystem 40.

(S109) The agent 20 determines whether to update the control model on the control model 30 based on the control model updatability information. When the determination result is updatability (Y), the process proceeds to a process subsequent to S110. When the determination result is not updatability (N), the process proceeds to S113.

(S110) The learning unit 22 stores the state value, the control value, the reward value, and the behavior value in the data storage unit 24.

(S111) The learning unit 22 reads learning data (the predetermined number of turns, the state value, or the like) from the data storage unit 24.

(S112) The learning unit 22 updates the parameters of the control model 30 of the control unit 21 based on the read learning data.

(S113) The learning unit 22 stops the operation.

Process Flow of Learning Management Agent

Figure 8:
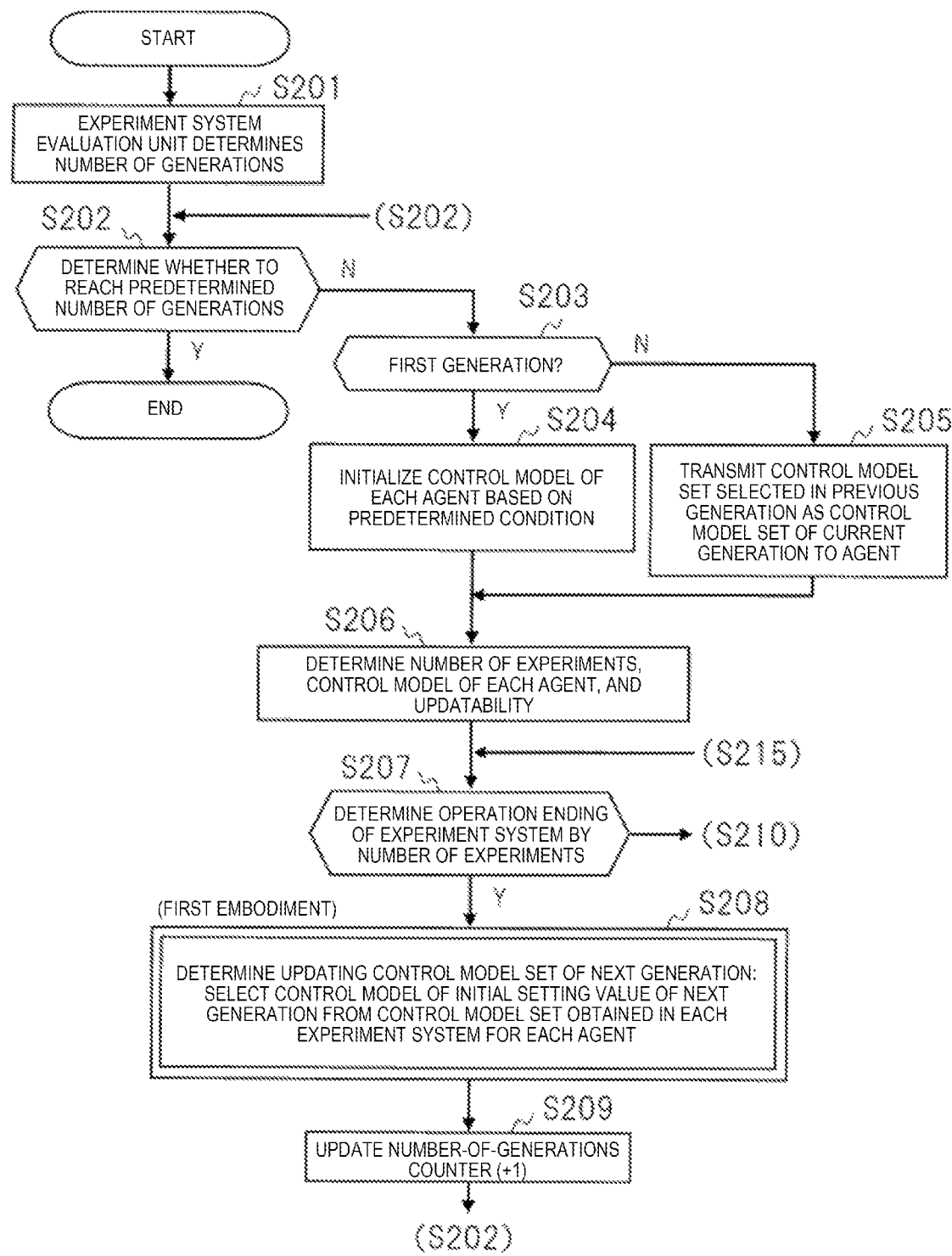
FIG. 8 is a diagram illustrating a first process flow of a learning management agent according to the first embodiment.
Figure 9:
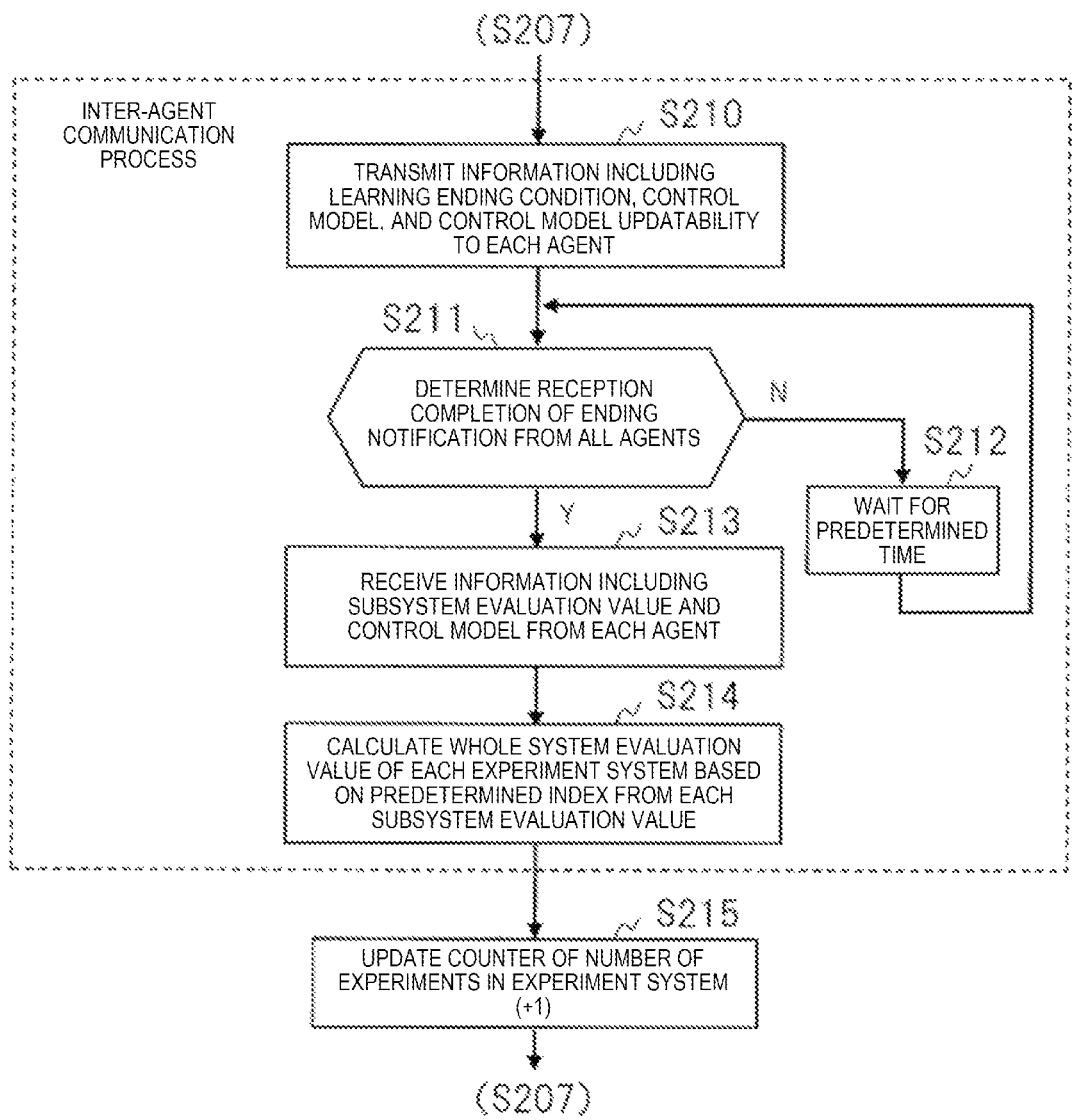
FIG. 9 is a diagram illustrating a second process flow of the learning management agent according to the first embodiment.

An operation of the learning management agent 10 will be described with reference to FIGS. 8 and 9. FIG. 8 illustrates a first process flow of the learning management agent 10. In FIG. 8, steps S201 and S209 are included. FIG. 9 illustrates a second process flow of the learning management agent 10. In FIG. 9, steps S210 to S215 are included. Processes of S210 to S214 in FIG. 9 are defined as an inter-agent communication process. Hereinafter, the steps will be described in order. FIGS. 8 and 9 illustrate flows of a case of a scheme in which the plurality of experiment systems 50 {#1 to # M} are constructed and operate in sequence chronologically.

(S201) The experiment system evaluation unit 11 of the learning management agent 10 determines the number of generations.

(S202) The learning management agent 10 determines whether the number of generations reaches a predetermined number of generations. When the determination result reaches the predetermined number of generations (Y), the learning ends. When the determination result does not reach the predetermined number of generations (N), the process proceeds to S203.

(S203) The experiment system evaluation unit 11 determines whether the generation is the first generation. When the generation is the first generation (Y), the process proceeds to S204. When the generation is not the first generation (N), the process proceeds to S205.

(S204) The experiment system evaluation unit 11 initializes the control model 30 of each agent 20 based on any predetermined condition.

(S205) The experiment system evaluation unit 11 transmits the control model set selected from the control models of the previous generation as the control models of the current generation to each agent 20. At this time, the communication unit 13 transmits the corresponding control model information to the corresponding agent 20. The control model set is a control model set updated as an initial setting value of the experiment system 50 of the next generation described above (see FIG. 5).

(S206) The experiment system evaluation unit 11 determines a predetermined number of experiments, the control model 30 of each agent 20, and whether to update the control model.

(S207) The experiment system evaluation unit 11 determines an operation ending of the experiment system 50 by the predetermined number of experiments. When the determination result is the ending (Y), the process proceeds to S208. When the determination result is not the ending (N), the process proceeds to S210 of FIG. 9.

(S208) The experiment system evaluation unit 11 selects and determine updating control model set of an initial setting value of the next generation from the control model set obtained in each experiment system 50 based on the whole system evaluation value calculated from the learning result of each experiment system 50. The control model operation unit 12 sets the control model set to be transmitted to each agent 20 according to the determination of the experiment system evaluation unit 11.

(S209) The learning management agent 10 updates a number-of-generations counter and the process returns to S202.

(S210) On the other hand, in S210 of FIG. 9, the experiment system evaluation unit 11 delivers the learning ending condition and the control model updatability information to the communication unit 13. The control model operation unit 12 delivers the information regarding the control model set to the communication unit 13. The communication unit 13 transmits information including the learning ending condition, the control model updatability, and the control model to each corresponding agent 20.

(S211) The experiment system evaluation unit 11 performs reception completion determination of ending notification from all the agents 20. When the determination result is reception completion (Y), the process proceeds to S213. When the determination result is reception incomplete (N), the process proceeds to S212.

(S212) The learning management agent 10 waits for a predetermined time.

(S213) The communication unit 13 receives information including the subsystem evaluation value and the control model from each agent 20. The communication unit 13 delivers each subsystem evaluation value to the experiment system evaluation unit 11 and delivers the control model set information to the control model operation unit 12.

(S214) The experiment system evaluation unit 11 calculates the whole system evaluation value of each experiment system 50 based on a predetermined index from the subsystem evaluation value of each agent 20. The index may be, for example, a simply added sum or a weighted added sum and is not particularly limited. As an example of the weighted added sum, a weight of an evaluation value of a specific agent 20 connected to a specific significant subsystem 40 may be increased.

(S215) The learning management agent 10 updates a counter of the number of experiments in the experiment system 50 after the inter-agent communication process, and then the process returns to S207.

Advantages

As described above, in the learning control system according to the first embodiment, the learning efficiency can be improved even under the incomplete information at the time of controlling the MARL, and thus it is possible to achieve optimization of the whole system. The learning control system according to the first embodiment includes the learning management agent 10 that manages and controls the learning of the plurality of generations in the plurality of experiment systems 50 including the plurality of agents 20. In the learning control system, of the plurality of experiment systems 50 of a certain generation, the control model set of the experiment system 50 in which the whole system evaluation value after the learning is the highest is selected and determined as the initial setting value of the experiment system 50 of the next generation (see FIG. 5). Thus, it is possible to improve the learning efficiency.

The learning control system according to the first embodiment provides a structure that changes a balanced point (a portion in a balanced state in which the control models 30 are not updated) of the plurality of control models 30 so that learning stagnation is reduced or prevented even under the incomplete information between the agents 20. The learning management agent 10 sets the control model updatability information so that the agents 20 updating the control models 30 are changed between the generations. Thus, it is possible to break the balanced state and improve the learning stagnation.

Second Embodiment

A learning control system according to a second embodiment of the invention will be described with reference to FIGS. 10 and 11. A basic configuration of the second embodiment is the same as that of the first embodiment. Hereinafter, configurations of the second embodiment different from the first embodiment will be described. In the second embodiment, an evolution strategy (EG) calculation scheme is used together as a scheme of determining and updating a control model of the next generation. As the evolution strategy calculation scheme, a known technology can be applied. In the second embodiment, a test for evolution strategy calculation is performed and a whole system evaluation value is subsequently calculated for each experiment system 50. A control model set of the next generation is selected and determined based on the whole system evaluation value.

Hereinafter, learning management in which the evolution strategy calculation scheme according to the second embodiment will be described. First, a difference in hardware and software configurations is that a program that performs evolution strategy calculation and its control is mounted on the learning management agent 10 of the learning management device 1 in FIG. 2 and the agent 20 of the subsystem automatic control device 2.

Evolution Strategy Calculation

Figure 10:
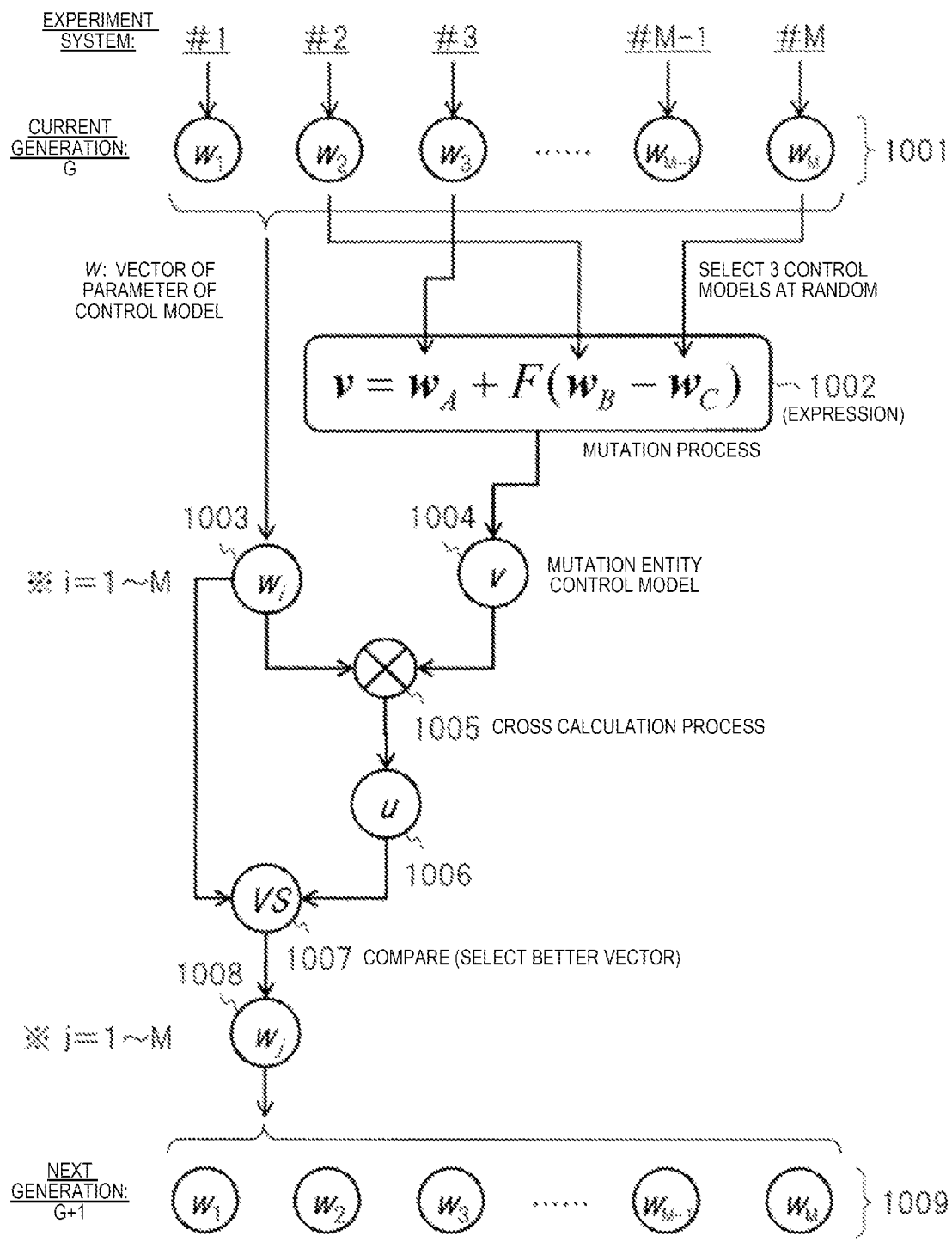
FIG. 10 is a diagram illustrating evolution strategy calculation in a learning control system according to a second embodiment of the invention.

FIG. 10 illustrates the evolution strategy calculation according to the second embodiment. Of known evolution strategy calculation schemes, an algorithm called differential evolution (DE) is used in the second embodiment.

The learning management agent 10 receives a control model set of the experiment system 50 {#1 to # M} after the learning completion in the current generation G from each agent 20. The learning management agent 10 treats parameters of the control model set as vectors. The vectors are referred to as vectors w1 to wM of the current generation G. For example, the control model set of experiment system #1 is expressed as a vector w1.

The learning management agent 10 applies an evolution strategy calculation process of FIG. 10 to the vectors w1 to wM of the current generation G for each agent 20 {A1 to AN}. Thus, the vectors w1 to wM of the next generation G+1 are generated. The control model set of the next generation is determined from the result.

Process Flow of Learning Management Agent

Figure 11:
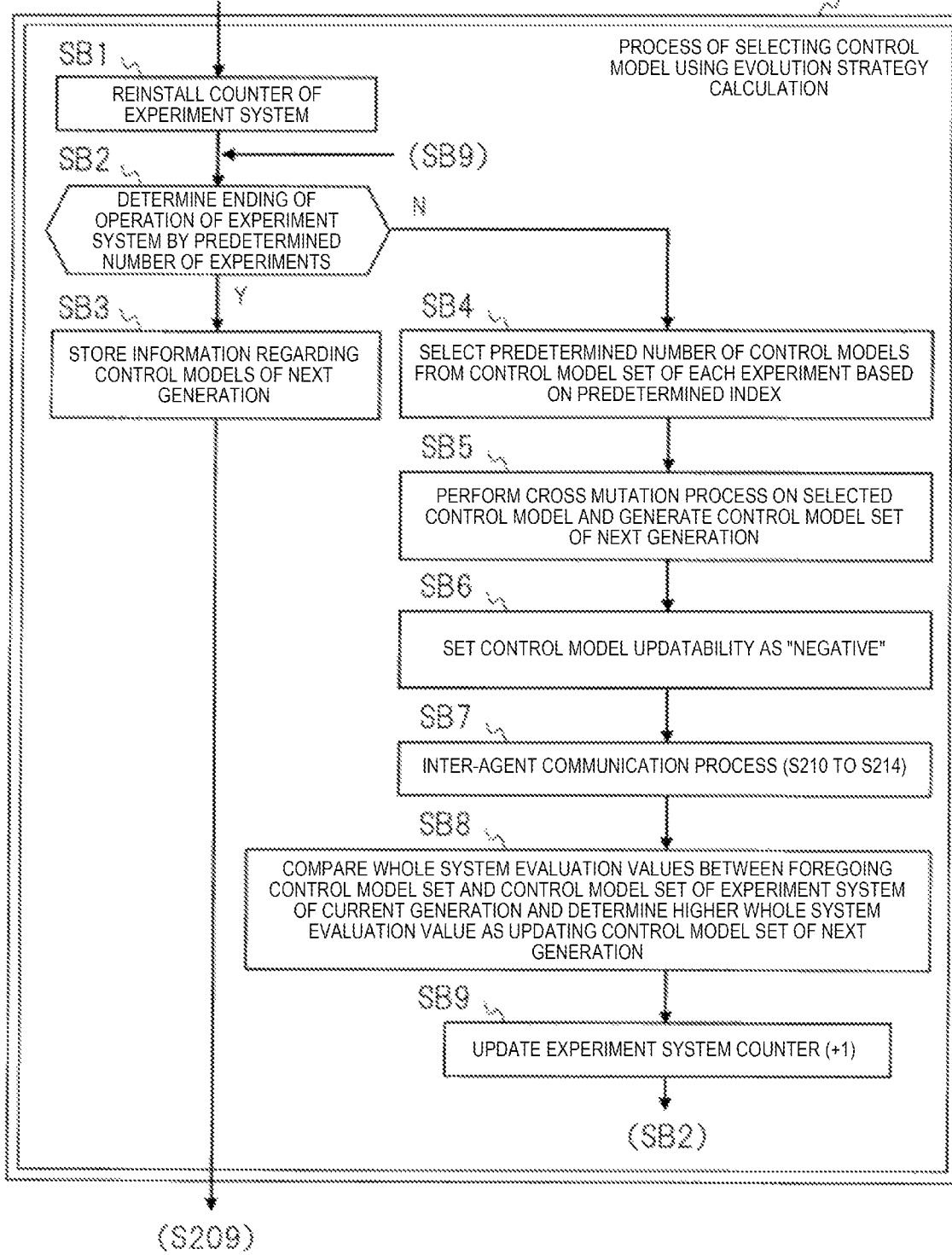
FIG. 11 is a diagram illustrating a process flow of a learning management agent according to the second embodiment.

FIG. 11 illustrates a process flow of the learning management agent 10 according to the second embodiment. The flow according to the second embodiment includes step S208B differently from a portion of step S208 in the flow of FIG. 8 in the first embodiment. The other portions except for step S208B are the same. Step S208B is a process of selecting a control model using evolution strategy calculation (a process of determining an updating control model set of the next generation). The process of step S208B includes steps SB1 to SB9. Hereinafter, the description will be made in the order of the steps.

(SB1) In the evolution strategy calculation process according to the second embodiment, a test is performed with each experiment system 50 {#1 to # M} so that the parameters of the control model 30 of each agent 20 are not updated. Thereafter, the whole system evaluation value after application of the evolution strategy calculation is calculated. Therefore, in SB1, the learning management agent 10 first reinstalls (resets) the counter of the number of experiments of the experiment system 50 as in the learning.

(SB2) Subsequently, the learning management agent 10 performs the ending determination of the operation of the experiment system 50 by the predetermined number of experiments. When the determination result is an end (Y), the process proceeds to SB3. When the determination result is not the end (N), the process proceeds to SB4.

(SB3) The learning management agent 10 stores information regarding the parameters of the control models 30 of the next generation in the generation order of the control models 30 {#1 to # M} in a DB, and then the process proceeds to step S209 described above.

(SB4) The learning management agent 10 selects a predetermined number of control models (parameters) from the control model set (the control models 30 of each agent 20) of the current generation obtained with the experiment of each experiment system 50 based on any predetermined index.

In an example in which the DE algorithm. in FIG. 10, three control models are selected at random. For example, the vectors w3, w2, and wM are selected. The invention is not limited to this example. As another scheme, roulette selection or the like in which graduated allocation is used may be performed according to the whole system evaluation value calculated from a result of each experiment system 50.

(SB5) The control model operation unit 12 performs a cross mutation process between the control models 30 to update numerical values of the parameters for each parameter of a predetermined number (three) of control model 30 selected in SB4. Thus, the control model set of the next generation is generated. The details thereof will be described below.

(SB6) The experiment system evaluation unit 11 sets the control model updatability of the control model 30 of each agent 20 as "negative". For the test, any number of turns (for example, 50 turns) is set as the learning ending condition herein.

(SB7) The learning management agent 10 uses the communication unit 13 to perform the inter-agent communication process with each agent 20 on the information including the control model set, the control model updatability, and the learning ending condition. The process is the same as that in FIG. 9.

(SB8) The learning management agent 10 compares the whole system evaluation value calculated with regard to the control model set generated in the test to which the evolution strategy calculation is applied to the whole system evaluation value of the control model set of the experiment system 50 of the current generation before the application of the evolution strategy calculation. As a comparison result, the learning management agent 10 determines the control model set corresponding to the higher whole system evaluation value as the control model set of the updating experiment system 50 of the next generation.

(SB9) The learning management agent 10 updates the counter of the experiment system, and then the process returns to SB2.

Cross Mutation Process

A cross mutation process using the DE algorithm related to step SB5 will be described with reference to FIG. 10. In the cross mutation process, an F value and a mutation ratio called scaling parameters are set in advance. The learning management agent 10 sequentially generates the control model 30 {C1 to CN} of each agent 20 {A1 to AN} in each experiment system 50 {#1 to # M}.

The learning management agent 10 first prepares the control models C1 to CN of experiment systems #1 to # M for a first agent (agent A1) of experiment system #1. In the example of FIG. 10, three control models 30 are selected at random. For example, the vectors w3 w2, and wM are selected. The selected vectors are substituted with vectors wA, wB, and wC of Expression 1002 (w3→wA, w2→wB, and wM→wC). The learning management agent 10 performs the mutation process expressed in Expression 1002 for each parameter of the selected control model. Expression 1002 is v=wA+F (wB−wC). The F value is a cancelling parameter and a value in 0.0 to 1.0 is input. A result of Expression 1002 is a vector v (a value 1004). Thus, a control model (the vector v) which is a mutation entity is generated.

Subsequently, the learning management agent 10 performs a cross calculation process 1005 with a vector wi of the control model in the same order (i-th) as that of the counter of the experiment system and the vector v of the mutation entity. Each of the vectors w1 to wM of the current generation G is expressed as the vector wi (a value 1003). Here, i=1 to M and the same process is performed for each vector. An output value of the cross calculation process 1005 is a vector u (a value 1006) and corresponds to a control model of a slave entity. In the cross calculation process 1005, a random number is generated for each parameter with regard to the vector wi of the current generation G and the generated vector v. When the mutation ratio is equal to or less than a predetermined mutation ratio, the parameter of the generated vector v is selected. Otherwise, the parameter of the vector wi of the current generation is selected.

The learning management agent 10 performs a comparison process 1007 with the vector wi of the current generation G and the vector u. The comparison process 1007 is a process of selecting a better vector between the vector wi and the vector u. An output value of the comparison process 1007 is a vector wj (value 1008). Here, j=1 to M. A control model set 1009 of the next generation G+1 is generated as the vector wj (a value 1008). For a second agent (A2) to an n-th agent (AN) in experiment system #1, the foregoing process is performed to generate a slave entity.

The learning management agent 10 transmits the corresponding control model information in the generated control model set 1009 of the next generation to each agent 20 of the experiment system 50 and sets each control model 30 {C1 to CN}. Then, the learning management agent 10 performs inter-agent communication, causes the predetermined number of turns (for example, 50 turns) to be operated, and acquires the whole system evaluation value of each experiment system 50.

The learning management agent 10 compares the whole system evaluation value of the experiment system 50 before the application of the evolution strategy calculation process to the whole system evaluation value of the experiment system 50 after the application. When the evaluation value after the application is high, the corresponding control model set is determined as the control model set of the experiment system 50 of the next generation. The foregoing process is also performed in experiment systems #2 to # M.

In the evolution strategy calculation process, the invention is not limited to the DE algorithm and another scheme may be used. For example, a genetic algorithm or the like may be used in another evolution strategy calculation scheme. An algorithm similar to the algorithm of the evolution strategy calculation scheme may be used. For example, a group intelligence algorithm such as an artificial bee colony that performs optimization using a plurality of entities may be used.

Advantages

As described above, in the learning control system according to the second embodiment, the learning efficiency can be improved even under the incomplete information at the time of controlling the MARL, and thus it is possible to achieve optimization of the whole system. In the second embodiment, a balanced state of the learning of the MARL is forcibly broken through the evolution strategy calculation and the control model is selected and updated. Thus, even when the balanced state of the MARL occurs, it is possible to improve learning stagnation and improve learning efficiency.

Third Embodiment

A learning control system according to a third embodiment of the invention will be described with reference to FIGS. 12 to 14. A basic configuration of the third embodiment is the same as the configuration of the first or second embodiment. A more detailed configuration of a case in which the system 100 is the SCM system will be described as a difference.

Preliminary Learning and Whole Learning

Figure 12:
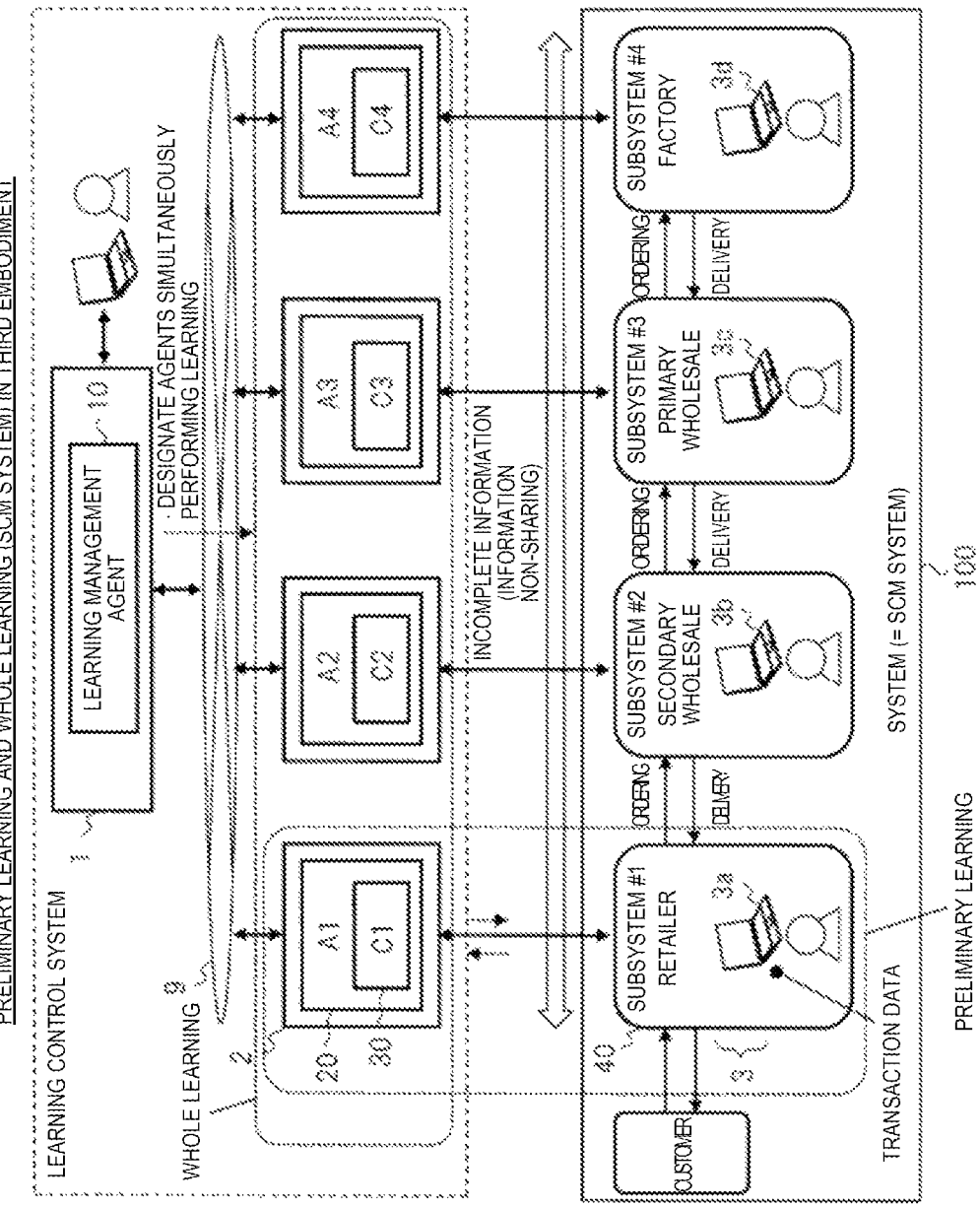
FIG. 12 is a diagram illustrating preliminary learning, whole learning, and an SCM system in a learning control system according to a third embodiment of the invention.

FIG. 12 illustrates a case in which the system 100 is the SCM system as a configuration of the learning control system according to the third embodiment. The learning control system according to the third embodiment performs preliminary learning and whole learning as learning. The preliminary learning is learning in units of the subsystems 40. In the subsystem 40, a transaction (an actual transaction or a simulation transaction) is performed and transaction data is accumulated. The corresponding agent 20 performs the preliminary learning using the transaction data of the corresponding subsystem 40. Subsequently, in each of the plurality of subsystems 40, a transaction is performed and transaction data is accumulated. Then, the plurality of agents 20 perform the whole learning.

Learning in SCM System

An example of the configuration of the SCM system of the system 100 is the same as that in FIG. 3 described above. Learning in the SCM system will be described. In this example, direct communication is not performed between the agents 20 {A1 to A4} and each agent 20 communicates with the learning management agent 10. In this example, information non-sharing between the subsystems 40 and a situation of incomplete information between the agents 20 are assumed.

First, each agent 20 {A1 to A4} performs the preliminary learning in units of the subsystems 40. Thereafter, the plurality of agents 20 {A1 to A4} perform the whole learning. In any learning, a transaction of a predetermined number of turns (for example, 100 turns) in the SCM system is performed and transaction data is accumulated before the learning. In the subsystem terminal device 3 of each subsystem 40, a stock amount, remaining received orders, a shipment amount, a received order amount, and an ordering amount are accumulated as transaction data for each turn. The agent 20 acquires the transaction data and accumulates the transaction data in the data storage unit 24 so that the transaction data can be used in learning.

In the preliminary learning, for example, when the agent A1 of a retailer (subsystem #1) performs learning, only the agent A1 performs reinforcement learning. Other subsystems #2 to #4 performs an ordering process by a person or a simulation player. The simulation player refers to a simulator that determines an ordering amount based on the transaction data. As the simulation player, for example, a simulator that determines a received order amount as an ordering amount without change is used.

After the preliminary learning ends, the agent A1 transmits the control model C1 and the subsystem evaluation value to the learning management agent 10. The agents A2 to A4 of the other subsystems 40 also perform the same preliminary learning. The control models C2 to C4 and the subsystem evaluation values are transmitted to the learning management agent 10.

Subsequently, the whole learning is performed. In this example, 40 experiment systems 50 (experiment systems #1 to #40) are constructed and the learning is performed similarly to the scheme of the first or second embodiment. In the whole learning, in a case in which the agent 20 is connected to each subsystem 40, the learning is simultaneously performed by the plurality of agents 20. Here, the number of agents 20 simultaneously performing the learning is controlled by the learning management agent 10. The order of the agents 20 performing the learning may be any order. For example, the learning may be sequentially performed the agents 20 located downstream or may be performed at random. In this example, a scheme of determining the agents at random is used.

First, the learning management agent 10 selects, for example, agents A2 and A3 as the agents 20 performing the learning in the first generation G (see FIG. 13). The learning management agent 10 transmits information regarding the corresponding control model C2 obtained through the preliminary learning, the information regarding whether to update the control model, such as updating "positive", and a predetermined learning ending condition to the agent A2. Similarly, the learning management agent 10 transmits the control model C3 obtained through the preliminary learning, updating "possibility", and the learning ending condition to the agent A3. The learning management agent 10 transmits information regarding a dummy control model, such as a simulation player, performing an input and an output, the information regarding whether to update the control model, such as updating "negative", and the learning ending condition to the agents A1 and A4 which are other agents 20.

Each agent 20 {A1 to A4} performs an operation of the 40 experiment systems 50 {#1 to #40} based on the information received from the learning management agent 10. After the operation of each experiment system 50 ends, the agents A2 and A3 transmit the subsystem evaluation values (=cost) and the control models C2 and C3 of the learning results to the learning management agent 10.

The learning management agent 10 generates the updating control model set of the experiment systems 50 {#1 to #40} of the next generation G+1 based on the scheme of the first or second embodiment. In the learning of the next generation G+1, for example, the learning management agent 10 sets the dummy control model C1 in the agent A1, sets the control models C2 and C3 generated in the previous generation in the agents A2 and A3, and sets the control model C4 of the preliminary learning in the agent A4 to perform the learning. Under the predetermined learning ending condition, only the agent A4 is caused to perform the learning as the updating "positive". After the operation of each experiment system 50 {#1 to #40} ends, the agents A2 to A4 transmit the corresponding control models C2 to C4 and subsystem evaluation values (=cost) to the learning management agent 10.

Similarly, the learning management agent 10 further generates the updating control model set of the experiment systems 50 of the next generation G+2. In the learning of the next generation G+2, for example, the learning management agent 10 further sets the control model C1 obtained in the preliminary learning in the agent A1 and sets the control models C2 to C4 generated in the previous generation in the agents A2 to A4 to perform the learning. Under the predetermined learning ending condition, only the agent A1 is caused to perform the learning as the updating "positive". After the operation of each experiment system 50 ends, the agents A1 to A4 transmit the corresponding control models C1 to C4 and subsystem evaluation values (=cost) to the learning management agent 10.

In this way, after the control models 30 {C1 to C4} of all the agents 20 {A1 to A4} do not become the control models of the simulation player, the learning management agent 10 repeatedly performs the learning until the learning ending condition while arbitrarily changing the agents 20 that perform the learning.

Change in Updating Control Model

FIG. 13 illustrates a modification example of the control models 30 updated between the generations. Columns of the table indicate setting states of the control models 30 (C1 to C4) of the agents 20 (A1 to A4) of the experiment system 50. Rows of the table indicate a change in the setting state in association with the progress of the generation. Each item indicates a value of the control model updatability. Here, as values of the control model updatability, there are updatable (L), non-updatable (F), and a simulation player (N). When the value is set to the simulation player (N), the updatable "negative" is set. The right side of the table indicates the number of simultaneous learning agents together. The simultaneously learning agents are the agents 20 other than the agents 20 of which the control model updatability is the simulation player (N).

In this example, in the first generation (G), the agents 20 updating the control model 30 are the agents A2 and A3 which are set as the updatable (L). The agent A1 is set as the simulation player (N) setting the dummy control model. The agent A4 is set as the non-updatable (F). The number of simultaneous learning agents in the first generation is 2 to correspond to the agents A2 and A3.

In the second generation (G+1), the agent A4 is set as the updatable (L). The number of simultaneously learning agents in the second generation is 3 to correspond to the agents A2 to A4. In the third generation (G+2), the agent A1 is set as the updatable (L). After the third generation, the number of simultaneous learning agents is 4. In the fourth generation (G+3), the agents A1 and A2 are set as the updatable (L). In the fifth generation (G+4), the agent A3 is set as the updatable (L). In the sixth generation (G+5), the agent A4 is set as the updatable (L).

In this way, in the learning control system, the agents 20 updating the control model 30 and the simultaneous learning agents are changed between the plurality of agents 20 in association with selection of the optimum control models 30 between the generations. Thus, even when there is a portion in the balanced state in which the control models 30 are not updated, a forcible change is made. Accordingly, learning stagnation is reduced and prevented as a whole, and thus it is possible to achieve optimization of the whole system with a progress of the learning.

Learning Algorithm Example of Agent

A learning algorithm example of each agent 20 {A1 to A4} according to the third embodiment will be described. Each agent observes a state of the corresponding subsystem 40 (corresponding transaction), accumulates a state value (corresponding transaction data), and determines an ordering amount or the like which a behavior value by trial and error according to the basic operation described in the first embodiment. Each agent 20 outputs the behavior value to the subsystem 40 and configured the parameter of the control model 30 so that the cost of a predetermined number of turns (for example, 50 turns) is minimized. The agent A1 inputs the transaction data of a predetermined of turns (for example, 10 turns) as a state value from the data storage unit 24 that accumulates transaction data such as a stock amount, remaining received orders, a shipment amount, a received order amount, and an ordering amount in a turn order.

In the third embodiment, reinforcement learning is used as a method of acquiring the control model 30 of each agent 20. There is Q learning as a representative scheme of the reinforcement learning. However, when a multidimensional state value or a continuous behavior value are treated as in this example, it is difficult to prepare a Q table in which all the states and behaviors are included and it is difficult to mount the Q table in a scheme of using a general Q table is used. Accordingly, a method of performing function approximation of the Q table which is a value function may be taken.

In an instance in which an output of continuous behavior values are requested as in this example, for example, a method of combining an actor-critic method and a neural network may be used. The actor-critic method is a method of classifying functions into a behavior function of outputting a behavior value ($a_t$) based on an input state value ($s_t$) and a value function of outputting values according to an input of a behavior value ($a_t$), a state value ($s_t$), and a reward value ($r_t$). Thus, continuous behavior values can be output. A scheme of performing function approximation of the two functions to a neural network is used.

When Q learning is used, a temporal-difference (TD) error is calculated and a parameter ($\theta$) of a neural network is updated based on the TD error. A loss error function is defined using a target ($y_t$) for calculating the TD error so that this error is gradually improved. The target ($y_t$) is expressed with Expression 1 below.

$$y_t = r_t + \gamma q'(s_{t+1}, \mu'(s_{t+1}|\theta^{\mu'})|\theta^{Q'}) \qquad \text{Expression 1}$$

Here, $\gamma$ indicates a discount rate. $\theta^{\mu'}$ indicates a weight of an actor model when a behavior with a high possibility of the evaluation value of the best current state being in the state $s_t$ is taken. The actor model is expressed as $a_t=\mu(s_t|\theta^\mu)$. $\theta^{Q'}$ indicates a weight of a critic model. The critic model is expressed as $Q(s_t, a_t|\theta^{Q'})$. The value function updates the parameter (the weight of the critic model) $\theta^{Q'}$ so that the loss function L expressed in Expression 2 below is minimized.

$$L = \frac{1}{N}\Sigma_y(y_t - \mu'(s_t, a_t|\theta^{Q'}))^2 \qquad \text{Expression 2}$$

The parameter $\theta^\mu$ of the behavior function is updated using a gradient $\nabla$ of Expression 3 below.

$$\nabla_{\theta^\mu} J \approx \frac{1}{N} E_{\mu'}[\nabla_a Q(s,a|\theta^Q)|_{s=s_t, a=\mu(s_t)} \nabla_{\theta^\mu} \mu(s|\theta^\mu)] \qquad \text{Expression 3}$$

In the updating of each parameter, as expressed in Expressions 4 and 5 below, a method of gradually updating a weight may be taken using a coefficient $\tau$ (where $\tau\ll 1$).

$$\theta^\mu \leftarrow \tau\theta^\mu + (1-\tau)\theta^{\mu'} \qquad \text{Expression 4}$$

$$\theta^Q \leftarrow \tau\theta^Q + (1-\tau)\theta^{Q'} \qquad \text{Expression 5}$$

In this example, in a neural network of the behavior function and the value function, for example, learning is performed by setting a network structure that includes three intermediate layers with 16 units and 32 units, respectively. The invention is not limited to this structure and a structure that has an expression capability equal to or greater than this structure may be used.

Learning Result Example and Screen Display Example

FIG. 14 illustrates a learning result example and a screen display example when learning of the MARL is actually performed using the schemes of the first and second embodiments according to the third embodiment. The GUI unit 15 of the learning management device 1 configures a screen including the learning result information and displays the screen for a user.

In FIG. 14, the horizontal axis of the graph represents the number of learning turns (where 1 k=1000 turns) and the vertical axis represents cost (whole system cost) which is the whole system evaluation value. A predetermined number of turns is equivalent to one generation. In the graph, a learning result is plotted. A dotted line indicates a learning result when the scheme of the first embodiment is used and a solid line indicates a learning result when the scheme of the second embodiment is used.

On the horizontal axis of the graph, setting states of the agents 20{A1 to A4} of the subsystems 40 {#1 to #4} for each generation are indicated by numeral signs N, L, and F. N denotes a simulation player, L denotes control model updating "positive", and F denotes control model updating "negative". For example, a numeral sign "NLLN" means that the agents A1 and A4 are simulation players and the agents A2 and A3 are setting of the updating "positive" (the row of the generation G in FIG. 13).

A first learning course 1101 after start of the learning indicates a result when the control model 30 {C1 to C4} obtained by each agent 20 {A1 to A4} in the above-described preliminary learning is set for an operation. Thereafter, in the learning course 1102, as indicated by reference numeral "NLLN", note that the control models 30 of some {A1 and A4} of the agents 20 are replaced with the simulation players (N). The two agents A2 and A3 simultaneously performing the learning can be updated. In a subsequent learning course 1103, as indicated by reference numeral "NFFL", three agents A2 to A4 are not the simulation players, the number of simultaneously learning agents is 3, and the agent A4 can be updated. In a subsequent learning course 1104, as indicated by reference numeral "LFFF", all the agents A1 to A4 are not the simulation players, the number of simultaneous learning agents is 4, and the agent A1 can be updated. In a subsequent learning course 1105, all the agents A1 to A4 are not the simulation players and the number of simultaneously learning agents is 4.

In this way, the learning management agent 10 performs control such that the agent 20 set to be updatable (L) for each generation is changed while increasing the number of agents 20 simultaneously performing the learning for each generation to 2, 3, and 4. In this example, when the number of agents 20 simultaneously performing the learning increases, the cost temporarily increases particularly after the learning course 1103 and subsequently gradually decreases. That is, it can be understood that the optimization of the whole system is urged. In this example, in the final of the learning course 1105, the cost in the second embodiment is less than the learning result of the first embodiment.

MODIFICATION EXAMPLES—SYSTEM STRUCTURE EXAMPLE

In FIG. 12, the SCM system which is the system 100 has the structure in which the plurality of subsystems 40 are simply connected in series, but the structure of the system 100 to which the learning management of the first to third embodiments can be applied is not limited thereto.

Figure 15:
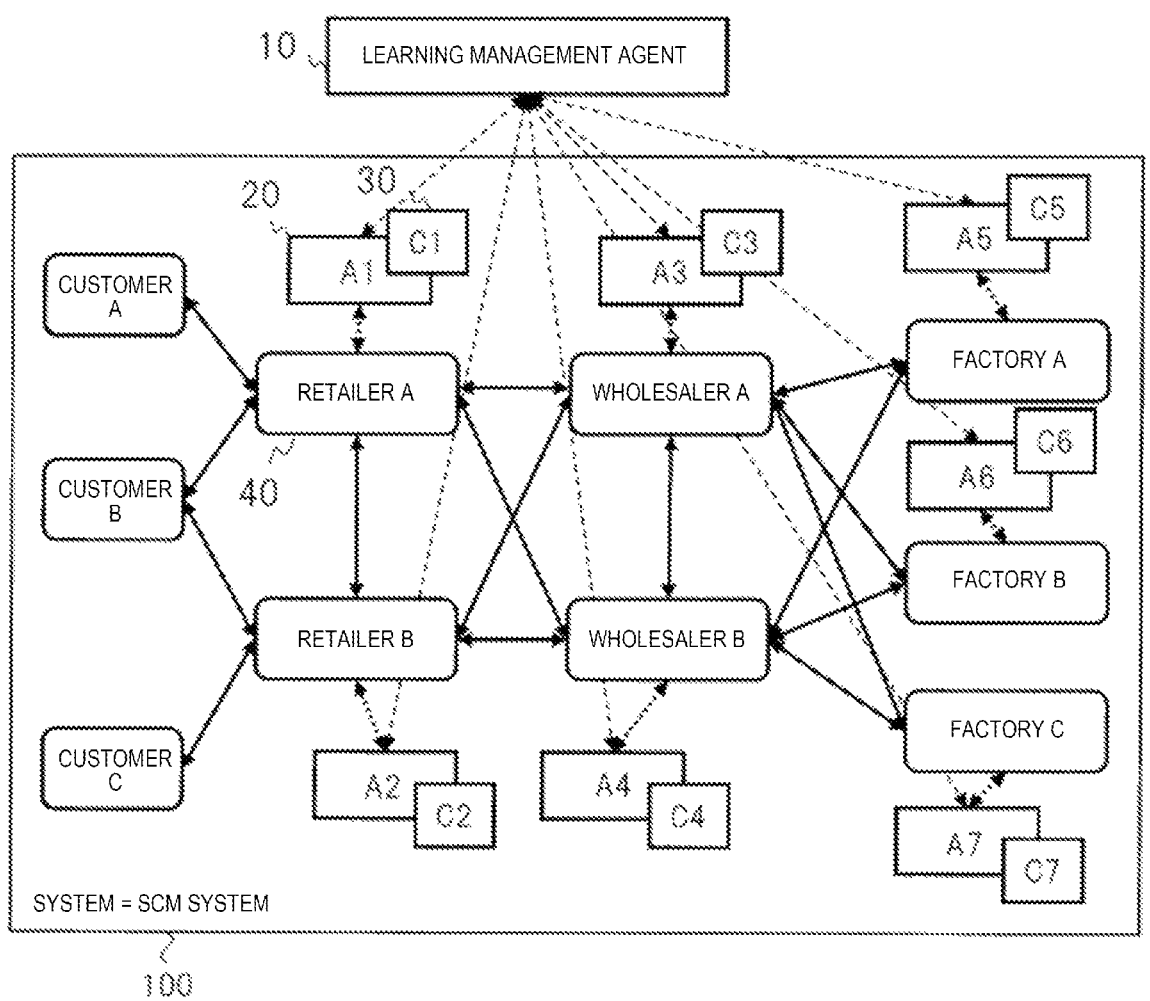

FIG. 15 illustrates a structure example of the system 100 according to a modification example. In this example, in the SCM system which is the system 100, the plurality of subsystems 40 are connected in a mesh network type. The SCM system of FIG. 12 has one location (a retailer, a wholesaler, or a factory) for each subsystem 40 from the downstream side to the upstream side. The invention is not limited thereto and the SCM system may have a structure in which a plurality of locations are connected for each subsystem 40. In the example of FIG. 15, three customers, two retailers, two wholesalers, and three factories are included and are connected in a mesh network type. The agent 20 is provided for each subsystem 40. In this example, the agents A1 to A7 are included. The agents A1 to A7 include the corresponding control models C1 to C7. Each agent 20 and the learning management agent 10 are connected to each other.

In the SCM system, the learning control system performs the reinforcement learning in the MARL. In this case, as described above, the number of agents 20 which are not simulation players and perform the learning gradually increases and all the agents A1 to A7 are finally in a state in which the agents are not the simulation players. Thus, the control models C1 to C7 optimizing the cost of the SCM system are obtained. The mesh network type system 100 is not limited to the SCM system, and the same can apply to various systems such as EG, transportation, finance, and the like and a complex system thereof.

Figure 16:
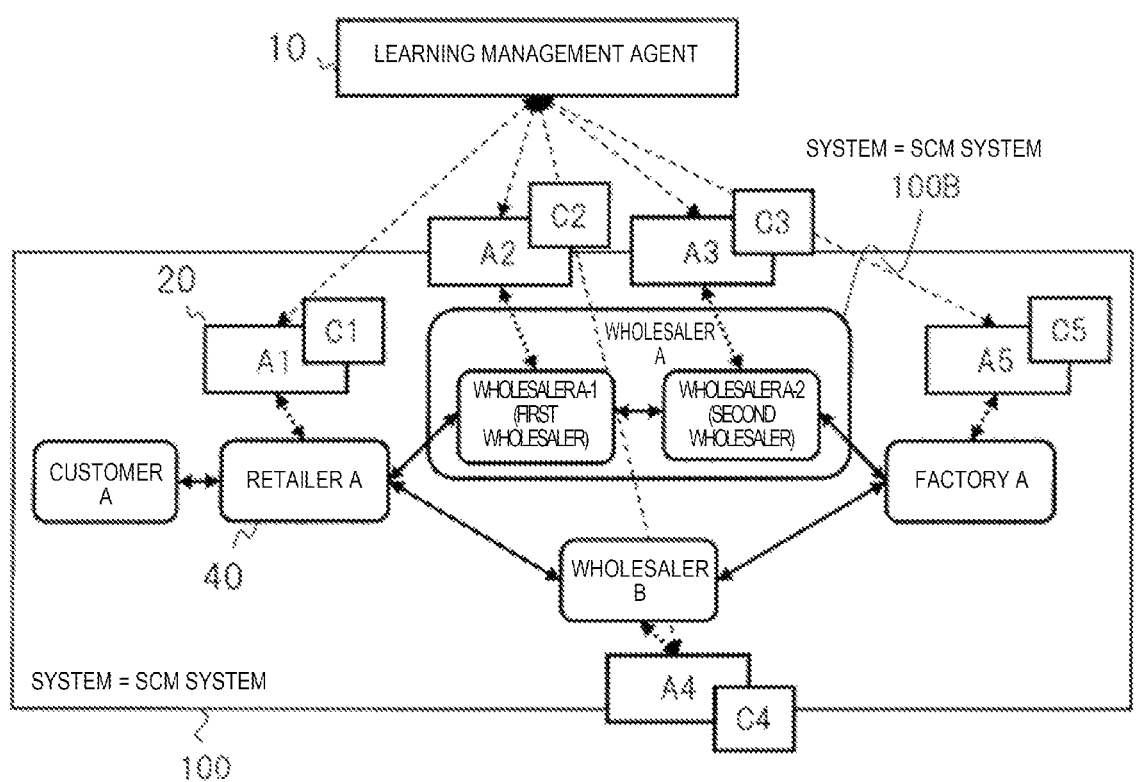

FIG. 16 illustrates a case of a nest type of SCM system as another structure example of the system 100. This structure further hierarchically includes a plurality of subsystems in some of the subsystems 40 in the system 100. In the example of FIG. 16, the system 100 includes one customer, one retailer, two wholesalers, and one factory as locations of the plurality of subsystems 40. The wholesalers A and B are included as two wholesalers. Further, the wholesaler A is configured as an SCM system 100B. The wholesaler A includes a first wholesaler A-1 and a second wholesaler A-2 as internal subsystems 40. The agents 20 of first and second hierarchical subsystems 40 are connected. In this example, the agents A1 to A5 are included and the control models C1 to C5 are included. Even in the case of the nest type of system 100, the same learning management can be applied and the control models C1 to C5 optimizing the cost of the system 100 are obtained.

Other Embodiments

Modification examples of the first to third embodiments will be exemplified below. In any modification example, it is possible to obtain the same advantages as those of the first to third embodiments.

Modification Example (1)

Figure 17:
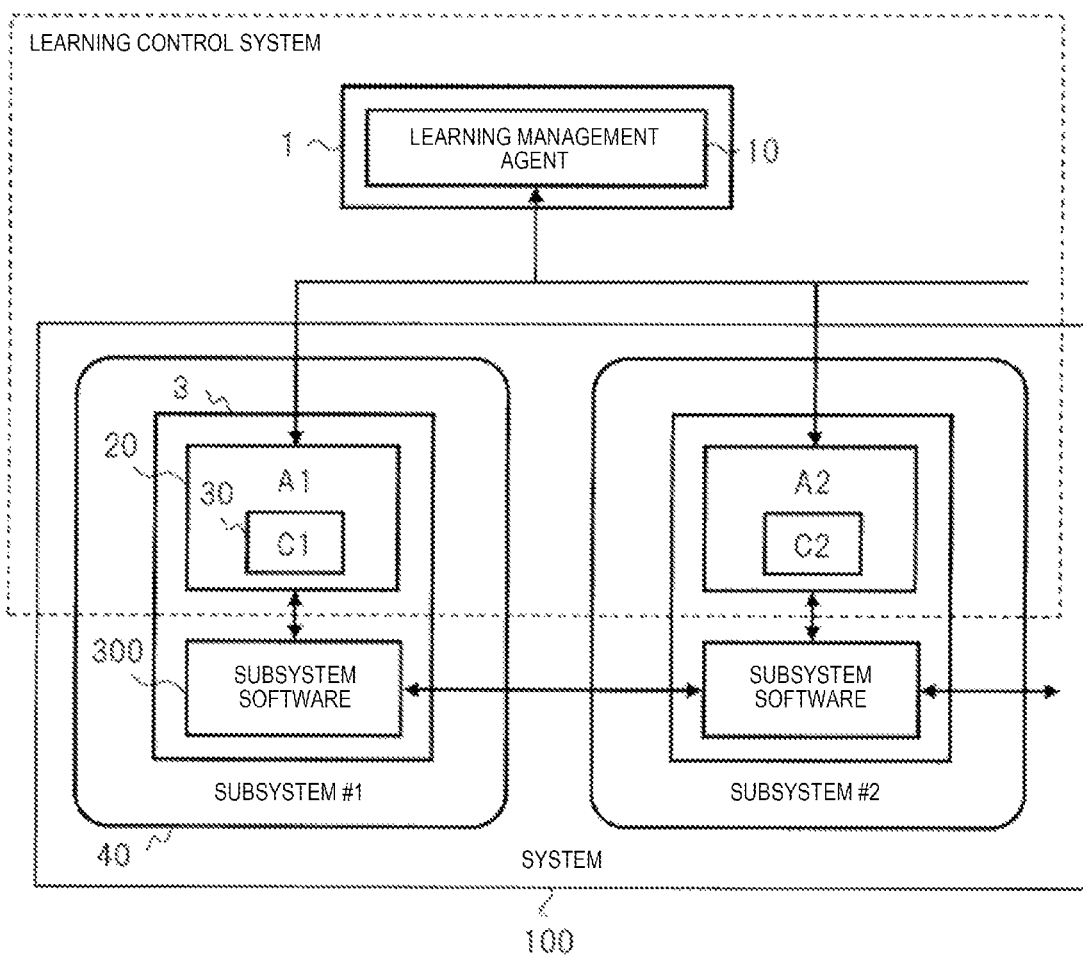

FIG. 17 illustrates a configuration of a learning control system according to a first modification example. In the modification example, the agent 20 is mounted on the subsystem terminal device 3 inside the subsystem 40 in addition to subsystem software 300. In other words, the subsystem terminal device 3 and the subsystem automatic control device 2 are mounted to be integrated. The agent 20 communicates the learning management agent 10 of the learning control device 1 via a wide area communication network.

Modification Example (2)

The invention is not limited to a form in which the learning management agent 10 and each agent 20 are connected for communication as a pair and the agents 10 may be connected directly for communication. For example, in a group (agent group) formed by a plurality of predetermined agents 10, direct communication may be performed between the agents 20 when information is shared mutually between the agents 20.

Figure 18:
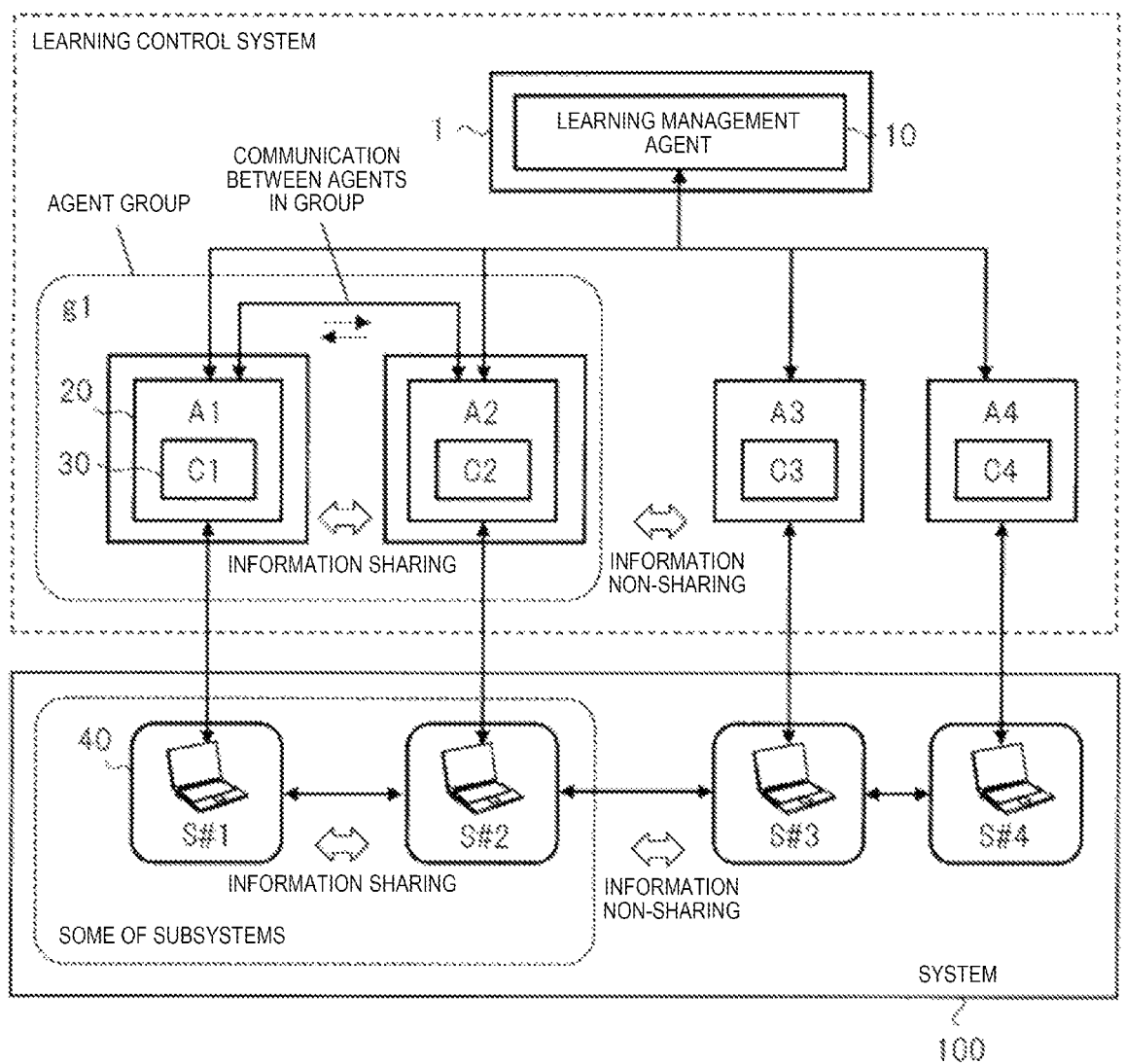

FIG. 18 illustrates a configuration of a learning control system according to a second modification example. In the modification example, the system 100 shares information mutually between some of the subsystems 40 and includes an agent group to correspond to the subsystems 40 that share information. The learning management agent 10 sets and manages the agent group. Inside the agent group, direct communication is performed mutually between the agents 20 via a communication path between the agents 20 to acquire and share mutual information. The agents 20 inside the group perform the learning using the information acquired from the other agents 20 in the same group.

In the example of FIG. 18, an agent group g1 is included and include the agents A1 and A2 sharing information. The information is not shared between the other agents 20 and the agent group g1. Inside the agent group g1, communication is performed mutually between the agents A1 and A2 to transmit and receive mutual information. For example, the agent A1 acquires information from the agent A2 and performs learning using the acquired information. For example, the agents 20 inside the group may exchange a state observation value of the subsystem 40 or information or the like regarding the control model 30. For example, the agent A1 acquires a state observation value of subsystem #2 from the agent A2, inputs the state observation value to the control model C1 of the agent A1, and performs the learning. Thus, it is possible to improve learning efficiency.

The learning management agent 10 may set a specific agent 20 among the plurality of agents 20 of the agent group as a representative agent. The representative agent and the learning management agent 10 representatively communicate with each other. The representative agent communicates with the other agents 20 inside the group, acquires information, and transmits the information to the learning management agent 10. The representative agent transmits information received from the learning management agent 10 to the other agents 20 of the group.

Modification Example (3)

The invention is not limited to the form in which the agent 20 is provided for each subsystem 40 and a common agent 20 may be provided in some or all of the plurality of subsystems 40.

Figure 19:
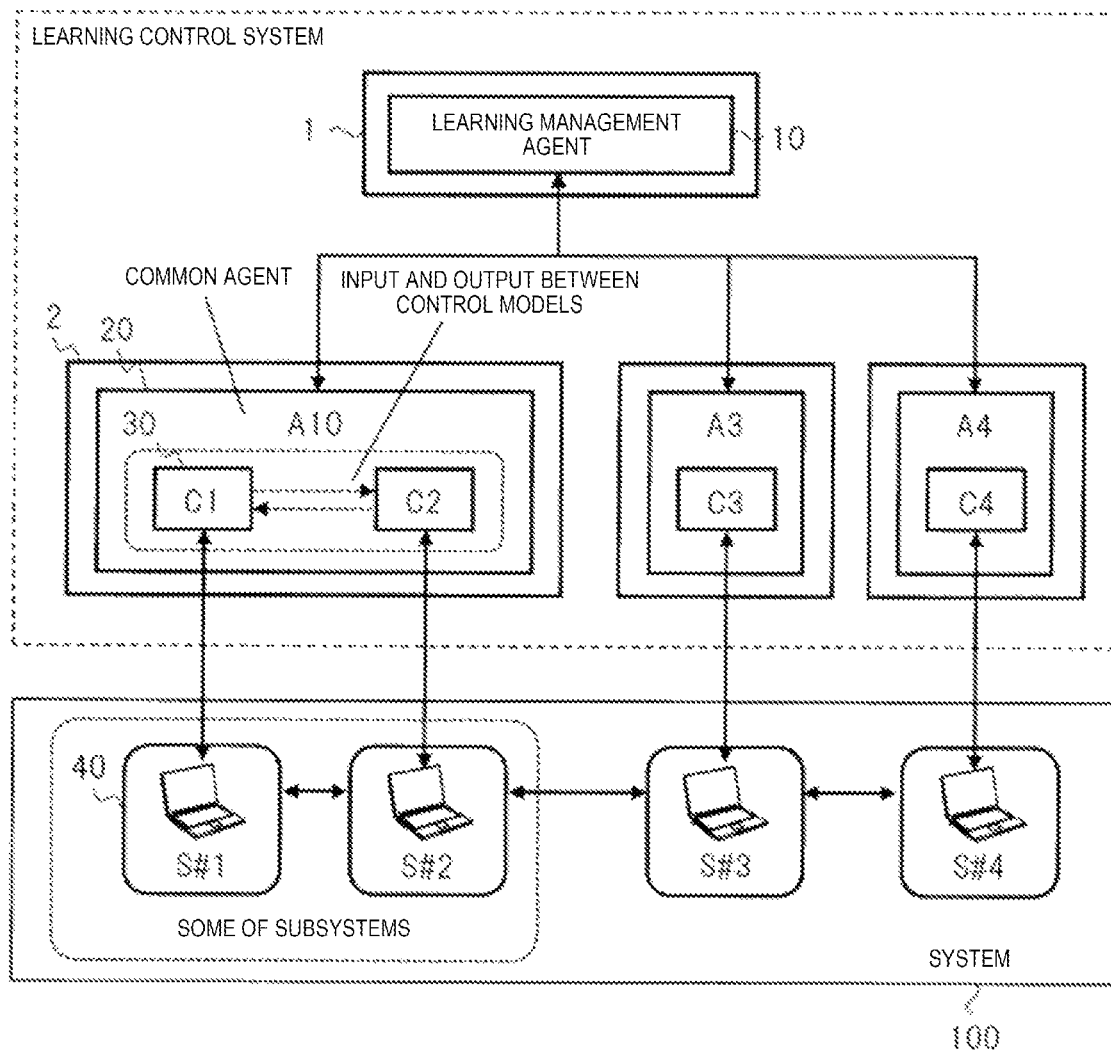

FIG. 19 illustrates a configuration of a learning control system according to a third modification example. In the modification example, one agent 20 (A10) is provided as a common agent in subsystems #1 and #2 which are some of the subsystems 40 of the system 100. For example, the agent 20 (A10) is mounted on the subsystem automatic control device 2. In the agent A10, two control models 30 {C1 and C2} corresponding to subsystems #1 and #2 are included. The learning management agent 10 controls updating of the two control models 30 {C1 and C2} inside the agent A10. Inputs and outputs of the control model C1 and the control model C2 are connected. For example, the control model C1 inputs an input value from subsystem #1 and an output value of the control model C2 and calculates the input value and the output value to obtain an output value to subsystem #1. The control model C2 inputs an input value from subsystem #2 and an output value of the control model C1 and calculates the input value and the output value to obtain an output value to subsystem #2.

Modification Example (4)

Figure 20:
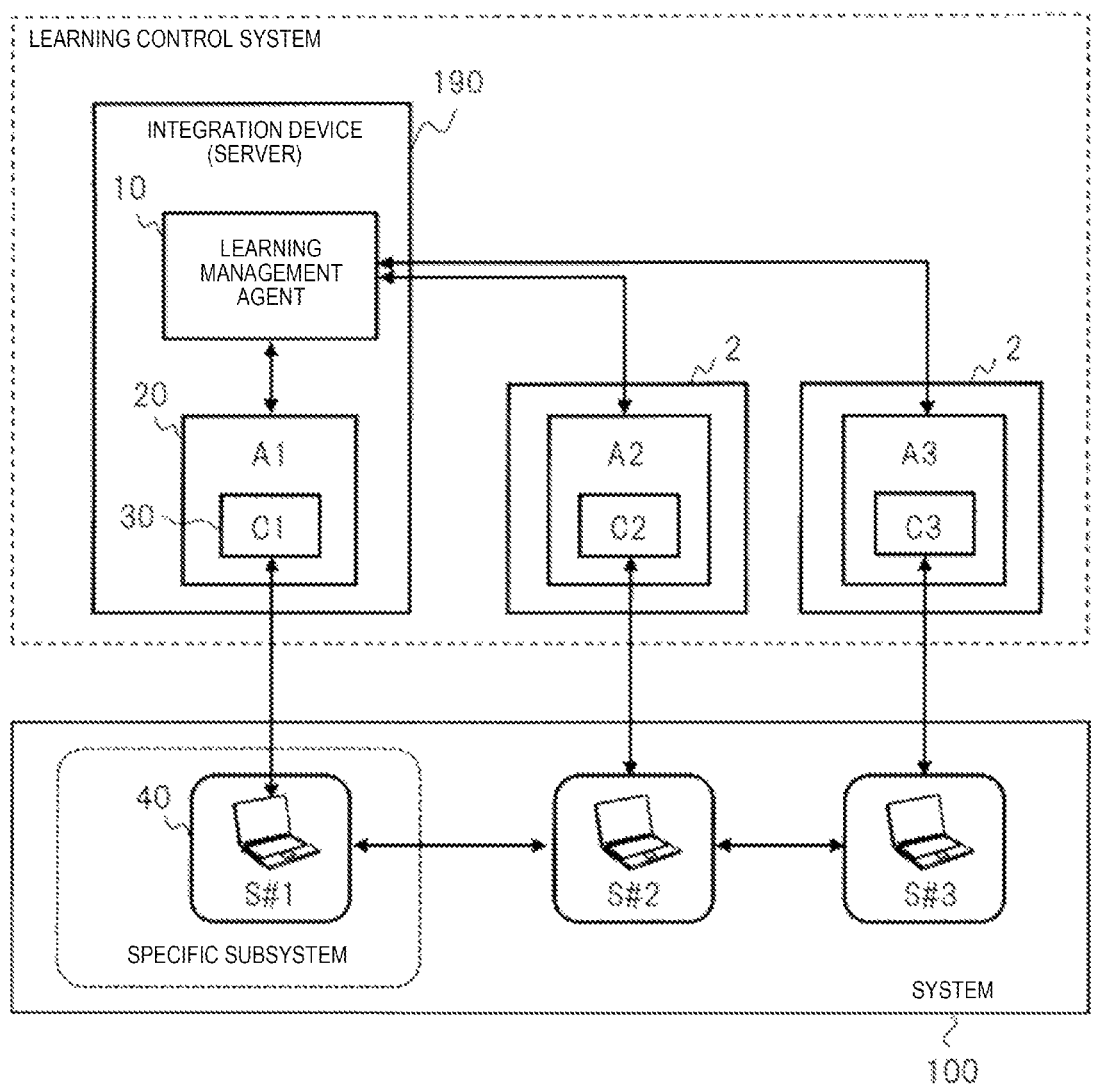

FIG. 20 illustrates a configuration of a learning control system according to a fourth modification example. In the modification example, the agent 20 and the learning management agent 10 are provided in one integration device 190 with regard to a specific subsystem 40. In the example of FIG. 20, the integration device 190 (for example, a server) is connected for communication to the subsystem terminal device 3 of subsystem #1 serving as the specific subsystem 40. The agent 20 (A1) of subsystem #1 and the learning management agent 10 are mounted on the integration device 190. The above-described automatic control devices 2 are provided in the other subsystem 40 of the system 100. The learning management agent 10 of the integration device 190 communicates with the agent A1 inside the automatic control device 2 and communicates with the agent of each automatic control device 2 via a wide area communication network.

Further, the integration device 190 may be provided inside the specific subsystem 40 or the integration device 190 and the subsystem terminal device 3 may be integrated as one device.

The invention has been described specifically according to the embodiments, but the invention is not limited to the above-described embodiments and can be modified in various forms within the scope of the invention without departing from the gist of the invention. The multi-agent learning scheme can be applied without being limited to the reinforcement learning scheme.

What is claimed is:

1. A learning control system controlling multi-agent learning in a predetermined system, the learning control system comprising:
   a computer system including a plurality of computers which are programmed to execute:
   a plurality of agents that are connected to a plurality of subsystems of the predetermined system, respectively, and perform learning to control the plurality of subsystems, which are control targets, using a plurality of control models; and
   a learning management agent that is connected to the plurality of agents for communication and manages and controls learning of each of the plurality of agents,
   wherein each of the plurality of agents:
      receives information including a respective control model of the plurality of control models from the learning management agent,
      calculates an evaluation value of a respective subsystem of the plurality of subsystems based on a state value of the respective subsystem,
      inputs the state value, determines a behavior value of the respective subsystem through calculation of the respective control model, and outputs the behavior value to the respective subsystem,
      updates a parameter of the respective control model in accordance with learning, and
      transmits information including the respective control model and the evaluation value of the respective subsystem to the learning management agent, and
   wherein the learning management agent:
      constructs a plurality of experiment systems including a plurality of control model sets in the plurality of agents in a state in which the plurality of agents are connected to the plurality of subsystems and controls learning in a plurality of generations in the plurality of experiment systems, and
      evaluates the plurality of experiment systems of a current generation of the plurality of generations based on the evaluation value of each of the plurality of subsystems, determines a plurality of updating control model sets in the plurality of experiment system of a next generation of the plurality of generations based on an evaluation result of the plurality of experiment systems of the current generation, and transmits information regarding the updating control model sets to the corresponding plurality of agents,
   wherein the learning management agent:
      calculates a whole system evaluation value of the predetermined system based on the evaluation value of each of the plurality of subsystems for each respective experiment system of the plurality of experiment systems, and
      performs updating so that the plurality of control model sets in a respective experiment system with a highest whole system evaluation value among the plurality of experiment systems of the current generation are set to initial setting values of the plurality of experiment systems of the next generation.

2. The learning control system according to claim 1, wherein the learning management agent:
   determines the agents simultaneously performing the learning among the plurality of agents of the plurality of experiment systems of the next generation, and increases a number of the agents simultaneously performing the learning between the plurality of generations.

3. A learning control system controlling multi-agent learning in a predetermined system, the learning control system comprising:
   a computer system including a plurality of computers which are programmed to execute:
   a plurality of agents that are connected to a plurality of subsystems of the predetermined system, respectively, and perform learning to control the plurality of subsystems, which are control targets, using a plurality of control models; and
   a learning management agent that is connected to the plurality of agents for communication and manages and controls learning of each of the plurality of agents,
   wherein each of the plurality of agents:
      receives information including a respective control model of the plurality of control models from the learning management agent,
      calculates an evaluation value of a respective subsystem of the plurality of subsystems based on a state value of the respective subsystem,
      inputs the state value, determines a behavior value of the respective subsystem through calculation of the respective control model, and outputs the behavior value to the respective subsystem,
      updates a parameter of the respective control model in accordance with learning, and
      transmits information including the respective control model and the evaluation value of the respective subsystem to the learning management agent, and
   wherein the learning management agent:
      constructs a plurality of experiment systems including a plurality of control model sets in the plurality of agents in a state in which the plurality of agents are connected to the plurality of subsystems and controls learning in a plurality of generations in the plurality of experiment systems, and
      evaluates the plurality of experiment systems of a current generation of the plurality of generations based on the evaluation value of each of the plurality of subsystems, determines a plurality of updating control model sets in the plurality of experiment system of a next generation of the plurality of generations based on an evaluation result of the plurality of experiment systems of the current generation, and transmits information regarding the updating control model sets to the corresponding plurality of agents,
   wherein each of the plurality of agents includes:
      a first communication unit that communicates with the respective subsystem which is the control target thereof,
      a second communication unit that communicates with the learning management agent,
      a state acquisition unit that acquires information including the state value from the respective subsystem,
      an evaluation unit that calculates the evaluation value of the respective subsystem based on the state value,
      a control unit that calculates a control value and a behavior value of the respective subsystem based on the state value and the respective control model,
      a learning unit that stores the state value, the control value, and the behavior value and updates the parameter of the respective control model in accordance with the learning, and a behavior output unit that calculates the behavior value of the respective subsystem from the control value and outputs the behavior value to the respective subsystem, and wherein the learning management agent includes:
 a communication unit that communicates with the plurality of agents,
 an experiment system evaluation unit that manages the plurality of experiment systems, evaluates the plurality of experiment systems of the current generation based on the evaluation value of each of the plurality of subsystems, and outputs the evaluation result, and
 a control model operation unit that determines the plurality of updating control model sets in the plurality of experiment systems of the next generation based on the evaluation result and outputs the information regarding the updating control model sets to the corresponding plurality of agents.

4. A learning control system controlling multi-agent learning in a predetermined system, the learning control system comprising:
 a computer system including a plurality of computers which are programmed to execute:
 a plurality of agents that are connected to a plurality of subsystems of the predetermined system, respectively, and perform learning to control the plurality of subsystems, which are control targets, using a plurality of control models; and
 a learning management agent that is connected to the plurality of agents for communication and manages and controls learning of each of the plurality of agents,
 wherein each of the plurality of agents:
  receives information including a respective control model of the plurality of control models from the learning management agent,
  calculates an evaluation value of a respective subsystem of the plurality of subsystems based on a state value of the respective subsystem,
  inputs the state value, determines a behavior value of the respective subsystem through calculation of the respective control model, and outputs the behavior value to the respective subsystem,
  updates a parameter of the respective control model in accordance with learning, and
  transmits information including the respective control model and the evaluation value of the respective subsystem to the learning management agent, and
 wherein the learning management agent:
  constructs a plurality of experiment systems including a plurality of control model sets in the plurality of agents in a state in which the plurality of agents are connected to the plurality of subsystems and controls learning in a plurality of generations in the plurality of experiment systems, and
  evaluates the plurality of experiment systems of a current generation of the plurality of generations based on the evaluation value of each of the plurality of subsystems, determines a plurality of updating control model sets in the plurality of experiment system of a next generation of the plurality of generations based on an evaluation result of the plurality of experiment systems of the current generation, and transmits information regarding the updating control model sets to the corresponding plurality of agents, wherein the learning management agent:
 performs an evolution strategy calculation process on the plurality of control model sets in the plurality of experiment systems of the current generation to generate a plurality of different control model sets, and
 selects one control model of the plurality of control models by comparing the plurality of control model sets of the current generation to the plurality of generated different control model sets for each respective control model of the plurality of agents and determines the plurality of updating control model sets in the plurality of experiment systems of the next generation.

5. The learning control system according to claim 4, wherein the learning management agent:
 generates a new control model by selecting a plurality of predetermined control models from the plurality of control model sets of the plurality of experiment systems of the current generation in the evolution strategy calculation process and taking a weighted sum of the parameters of the plurality of selected control models.

6. The learning control system according to claim 1, wherein the plurality of agents are mutual information non-sharing and do not perform direct communication.

7. The learning control system according to claim 1, wherein of the plurality of agents, at least some of the plurality of agents are mutual information sharing and perform direct communication for the information sharing.

8. The learning control system according to claim 1, wherein the learning management agent accumulates transaction data for each of the plurality of subsystems, performs preliminary learning as the learning based on the transaction data for each of the plurality of agents, and performs whole learning as the learning in all the plurality of agents after the preliminary learning.

9. The learning control system according to claim 1, wherein the plurality of subsystems of the predetermined system are connected in series.

10. The learning control system according to claim 1, wherein the plurality of subsystems of the predetermined system are connected in a mesh network form.

11. The learning control system according to claim 1, wherein the predetermined system is a supply chain management system, an energy supply network system, a transportation system, a finance system, or a complex system of the supply chain management system, the energy supply network system, the transportation system, and the finance system.

12. The learning control system according to claim 3, wherein the plurality of agents are mutual information non-sharing and do not perform direct communication.

13. The learning control system according to claim 3, wherein of the plurality of agents, at least some of the plurality of agents are mutual information sharing and perform direct communication for the information sharing.

14. The learning control system according to claim 3, wherein the learning management agent accumulates transaction data for each of the plurality of subsystems, performs preliminary learning as the learning based on the transaction data for each of the plurality of agents, and performs whole learning as the learning in all the plurality of agents after the preliminary learning.

15. The learning control system according to claim 3, wherein the plurality of subsystems of the predetermined system are connected in series.

16. The learning control system according to claim 3, wherein the plurality of subsystems of the predetermined system are connected in a mesh network form.

17. The learning control system according to claim 3, wherein the predetermined system is a supply chain management system, an energy supply network system, a transportation system, a finance system, or a complex system of the supply chain management system, the energy supply network system, the transportation system, and the finance system.

18. The learning control system according to claim 3, wherein the learning management agent:
   calculates a whole system evaluation value of the predetermined system based on the evaluation value of each of the plurality of subsystems for each respective experiment system of the plurality of experiment systems, and
   performs updating so that the plurality of control model sets in a respective experiment system with a highest whole system evaluation value among the plurality of experiment systems of the current generation are set to initial setting values of the plurality of experiment systems of the next generation.

19. The learning control system according to claim 4, wherein the learning management agent:
   calculates a whole system evaluation value of the predetermined system based on the evaluation value of each of the plurality of subsystems for each respective experiment system of the plurality of experiment systems, and
   performs updating so that the plurality of control model sets in a respective experiment system with a highest whole system evaluation value among the plurality of experiment systems of the current generation are set to initial setting values of the plurality of experiment systems of the next generation.

20. The learning control system according to claim 4, wherein the predetermined system is a supply chain management system, an energy supply network system, a transportation system, a finance system, or a complex system of the supply chain management system, the energy supply network system, the transportation system, and the finance system.

* * * * *